(12) United States Patent
Saiki et al.

(10) Patent No.: US 7,536,211 B2
(45) Date of Patent: May 19, 2009

(54) SPEAKER SYSTEM, MOBILE TERMINAL DEVICE, AND ELECTRONIC DEVICE

(75) Inventors: Shuji Saiki, Nara (JP); Sawako Usuki, Hyogo (JP); Shuhei Konishi, Osaka (JP)

(73) Assignee: Panasonic Corporation, Osaka (JP)

(*) Notice: Subject to any disclaimer, the term of this patent is extended or adjusted under 35 U.S.C. 154(b) by 666 days.

(21) Appl. No.: 11/376,932

(22) Filed: Mar. 16, 2006

(65) Prior Publication Data

US 2006/0166698 A1   Jul. 27, 2006

Related U.S. Application Data

(62) Division of application No. 10/185,909, filed on Jun. 28, 2002, now Pat. No. 7,050,600.

(30) Foreign Application Priority Data

| Jun. 28, 2001 | (JP) | ............... 2001-196033 |
| Jul. 19, 2001 | (JP) | ............... 2001-219370 |
| Oct. 2, 2001  | (JP) | ............... 2001-306145 |

(51) Int. Cl.
*H04M 1/00* (2006.01)
*H04Q 7/20* (2006.01)

(52) U.S. Cl. ............. 455/575.1; 455/350; 381/388; 381/423

(58) Field of Classification Search ............. 455/350, 455/566–567, 575.1; 381/388, 423
See application file for complete search history.

(56) References Cited

U.S. PATENT DOCUMENTS 4,820,952 A   4/1989   Lee 6,208,237 B1   3/2001   Saiki et al.
7,050,600 B2 * 5/2006   Saiki et al. ............. 381/388

FOREIGN PATENT DOCUMENTS

| EP | 1107641 A2 | 6/2001 |
| FR | 2649575 A1 | 1/1991 |
| JP | 60-191599 | 9/1985 |
| JP | H1-159487 | 11/1989 |
| WO | WO 99/37121 | 7/1999 |
| WO | WO 00/02417 | 1/2000 |
| WO | WO 00/69212 | 11/2000 |

OTHER PUBLICATIONS

Chinese Office Action dated Jul. 9, 2004 with English Translation.
European Search Report dated May 20, 2003.

* cited by examiner

*Primary Examiner*—Lee Nguyen
(74) *Attorney, Agent, or Firm*—RatnerPrestia

(57) ABSTRACT

A speaker system includes a display panel for displaying an image; a transparent panel provided such that the image displayed in the display panel is viewed through the transparent panel; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the display panel and the transparent panel. The transparent panel is allowed to be vibrated by the sound transferred to the space from the electric-mechanical-acoustic transducer via the acoustic signal transfer member.

12 Claims, 28 Drawing Sheets

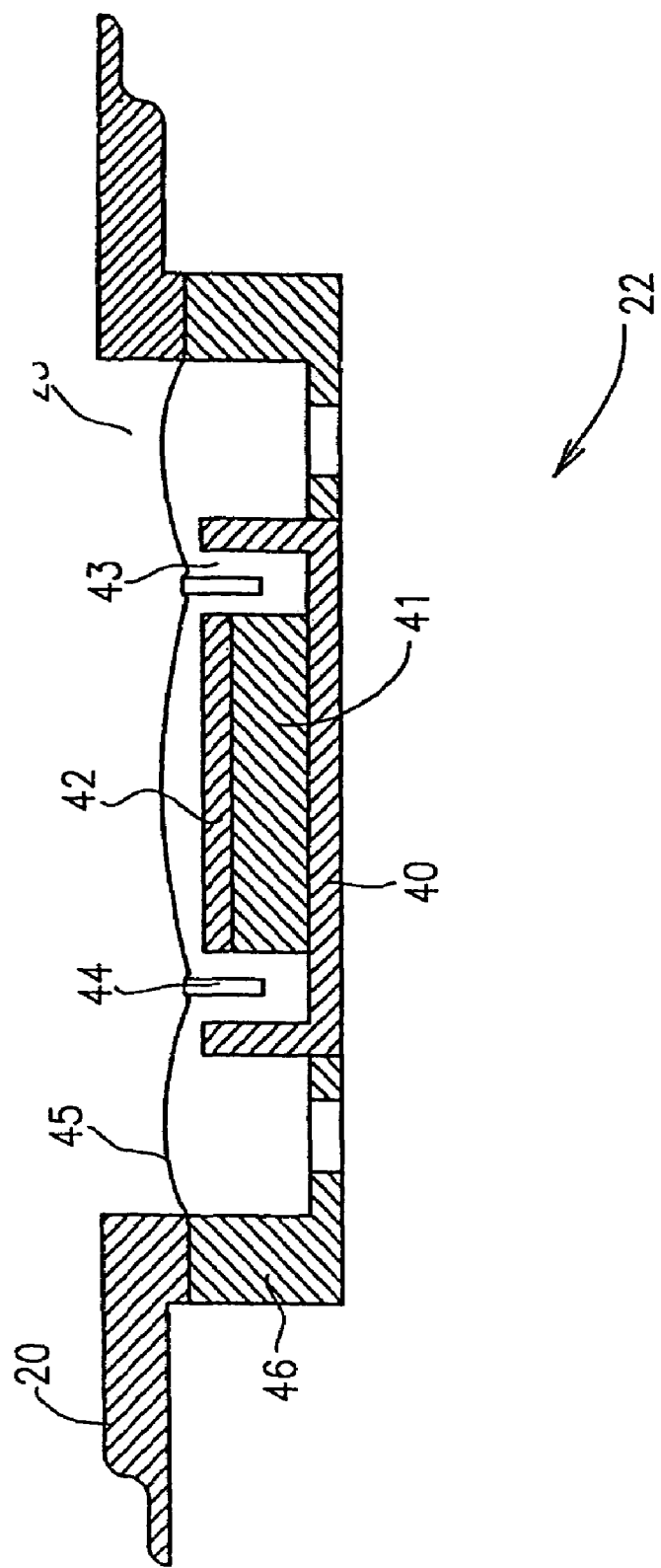

PRIOR ART

SPEAKER SYSTEM, MOBILE TERMINAL DEVICE, AND ELECTRONIC DEVICE

CROSS REFERENCE TO RELATED APPLICATIONS

The present patent application is a divisional of U.S. patent application Ser. No. 10/185,909, filed Jun. 28, 2002, now U.S. Pat. No. 7,050,600 which is incorporated herein by reference.

FIELD OF THE INVENTION

The present invention relates to a speaker system, and a mobile terminal device and an electronic device including the speaker system.

DESCRIPTION OF THE RELATED ART

With reference to FIG. 27, a conventional cellular telephone 15 will be described. Japanese Laid-Open Publication No. 8-275293 discloses a speaker system for vibrating a housing of a cellular phone by a driver directly attached to the housing so as to output a vibration or sound.

The cellular phone 15 includes a housing 10, an antenna 11, a sound board 12 which is thinner in a rear peripheral portion than the rest thereof, a driver 13 provided on a rear surface of the sound board 12, and a character display panel 14 provided on a front surface of the housing 10 adjacent to the sound board 12.

An operation of the cellular phone 15 will be described. When an electric signal is applied to the driver 13, the vibration of the driver 13 is directly transferred to the sound board 12 provided in the housing 10. Then, the sound board 12 is vibrated so as to generate a sound. The sound board 12 is thinner in the rear peripheral portion than the rest thereof, so as to be easily vibrated.

The cellular phone 15 having such a structure has the following problem. Due to the sound board 12, the planar size of the character display panel 14 for displaying a phone number or the like is inevitably provided in a small, limited space below the sound board 12. Accordingly, it is conventionally difficult to enlarge the display panel 14 for more conveniently displaying for example, characters of e-mails or images received through the Internet.

A conventional electronic device or a mobile terminal device including the above-described speaker system ha the following problem. In these devices, a display panel and a speaker are located separately. Therefore, the position where the image is displayed is different from the position from which the sound is output. This gives the user a sense of unnaturalness. For example, when the electronic device or the mobile terminal device is used as a Video telephone the user hag a sense of unnaturalness since the position of the image representing the person on the other end is different from the position from which his/her voice is output. It is more natural and desirable that the position where the image is displayed to the user is the same as the position from which the sound is output to the user.

SUMMARY OF THE INVENTION

According to one aspect to the invention, a speaker system includes a display panel for displaying an image; a transparent panel provided such that the image displayed in the display panel is viewed through the transparent panel; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the display panel and the transparent panel. The transparent panel is allowed to be vibrated by the sound transferred to the space from the electric-mechanical-acoustic-transducer via the acoustic signal transfer member.

In one embodiment of the invention, the acoustic signal transfer member is a housing for supporting the transparent panel. The housing has a sound hole. The sound is transferred to the speaker via the sound hole.

In one embodiment of the invention, the speaker system further includes an elastic member for supporting a peripheral portion of the transparent panel.

In one embodiment of the invention, the acoustic signal transfer member is an acoustic pipe.

In one embodiment of the invention, a thickness of a peripheral portion of the transparent panel is smaller than a thickness of a central portion of the transparent panel.

In one embodiment of the invention, the transparent panel it a film.

In one embodiment of the invention, the electric-mechanical-acoustic-transducer includes a mechanical vibration section for generating a mechanical vibration.

In one embodiment of the invention, the speaker system includes at least one more electric-mechanical-acoustic-transducer; and at least one more acoustic signal transfer member. The electric-mechanical-acoustic-transducers each include a diaphragm and each output a sound by vibrating the diaphragm in accordance with an electric signal. The acoustic signal transfer members each transfer the sound output from the respective electric-mechanical-acoustic-transducer to the space. The acoustic signal transfer members are connected to the space at different positions.

In one embodiment of the invention, the acoustic signal transfer member has a sound hole for transferring the sound. The sound hole extends in a direction parallel to a direction in which the display panel extends.

In one embodiment of the invention, the electric-mechanical-acoustic-transducer includes a housing for surrounding the diaphragm. The housing has an opening extending in a direction vertical to a direction in which the diaphragm vibrates. The opening is in connection with the acoustic signal transfer member.

According to another aspect of the invention a mobile terminal device includes a speaker system, and a housing for supporting the speaker system. The speaker system includes a display panel for displaying an image; a transparent panel provided such that the image displayed in the display panel is viewed through the transparent panel; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the display panel and the transparent panel, wherein the transparent panel is allowed to be vibrated by the sound transferred to the space from the electric-mechanical-acoustic-transducer via the acoustic signal transfer member. The mobile terminal device further includes an antenna for receiving a wireless signal; and a signal output section for outputting am electric signal to the electric-mechanical-acoustic-transducer based on the wireless signal received by the antenna. The electric signal represents at least one of a received sound, a call arrival sound, music and voice.

In one embodiment of the invention, when the electric signal represents the received sound, the transparent panel acts as a receiver.

In one embodiment of the invention, when the electric signal represents one of the call arrival sound, the music and the voice, the transparent panel acts as a loudspeaker.

In one embodiment of the invention, the electric-mechanical-acoustic-transducer includes one more diaphragm. The housing has a sound hole one of the diaphragm is provided so as to face the acoustic signal transfer member, and the other diaphragm is provided so as to face the sound hole.

According to still another aspect of the invention, an electronic device includes a speaker system; and a housing for supporting the speaker system. The speaker system includes a display panel for displaying an image; a transparent panel provided such that the image displayed in the display panel is viewed through the transparent panel; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the display panel and the transparent panel, wherein the transparent panel is allowed to be vibrated by the sound transferred to the space from the electric-mechanical-acoustic-transducer via the acoustic signal transfer member.

In one embodiment of the invention, the electronic device further includes a control section for controlling an operation of the electronic device. The transparent panel also acts as a touch panel for detecting a contact of a contact member with a position of the transparent panel corresponding is to an operation menu icon displayed in the display panel. The control section causes the electronic device to operate in accordance with the Operation menu icon corresponding to the position of the transparent panel which is in contact with the contact member.

In one embodiment of the invention, the touch panel is one of an electrostatic system touch panel, an optical system touch panel, an electromagnetic system touch panel, and an ultrasonic system touch panel.

According to still another aspect of the invention, a speaker system includes a display panel for displaying an image; a transparent panel provided such that the image displayed in the display panel is viewed through the transparent panel; a substrate provided between the display panel and the transparent panel such that the image is viewed through the substrate; an electric-mechanical-acoustic-transducer having a diaphragm for outputting a sound by vibrating the diaphragm in accordance with an electric signal: and an acoustic signal transform member for transferring the sound output from the electric-mechanical-acoustic-transducer to a space provided between the transparent panel and the substrate. The transparent panel is allowed to be vibrated by the sound transferred to the space from the electric-mechanical-acoustic-transducer via the acoustic signal transfer member.

In one embodiment of the invention, the substrate has a sound hole. The substrate acts as the acoustic signal transfer member.

In one embodiment of the invention, the space is provided among a spacer, for connecting a peripheral portion of the transparent panel and a peripheral portion of the substrate, the transparent panel and the substrate.

In one embodiment of the invention, the transparent panel is a film.

In one embodiment of the invention, the acoustic signal transfer member is an acoustic pipe.

In one embodiment of the invention, the speaker system includes at least one more electric-mechanical-acoustic-transducer; and at least one more acoustic signal transfer member. The electric-mechanical-acoustic-traducers each include a diaphragm and each output a sound by vibrating the diaphragm in accordance with an electric signal. The acoustic signal transfer members each transfer the sound output from the respective electric-mechanical-acoustic-transducer to the space. The acoustic signal transfer members are connected to the space at different positions.

According to still another aspect of the invention, a mobile terminal device includes a speaker system; and a housing for supporting the speaker system. The speaker system includes a display panel for displaying an image; a transparent panel provided such that the image displayed in the display panel is viewed through the transparent panel; a substrate provided between the display panel and the transparent panel such that the image is viewed through the substrate; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the transparent panel and the substrate, wherein the transparent panel is allowed to be vibrated by the sound transferred to the space from the electric-mechanical-acoustic-transducer via the acoustic signal transfer member. The mobile terminal device further includes an antenna for receiving a wireless signal; and a signal output section for outputting an electric signal to the electric-mechanical-acoustic-transducer based on the wireless signal received by the antenna. The electric signal represents at least one of a received sound, a call arrival sound, music and voice.

In one embodiment of the invention; when the electric signal represents the received sound, the transparent panel acts as a receiver.

In one embodiment of the invention, when the electric signal represents one of the call arrival sound, the music and the voice, the transparent panel act do a loudspeaker.

In one embodiment of the invention, the electric-mechanical-acoustic-transducer has one more diaphragm. The housing has a sound hole. One of the diaphragms is provided so as to face the acoustic signal transfer member, and the other diaphragm 16 provided so as to face the sound hole.

According to still another aspect of the invention, an electronic device includes a speaker system; and a housing for supporting the speaker system. The speaker system includes a display panel for displaying an image; a transparent panel provided such that the image displayed in the display panel is viewed through the transparent panel; a substrate provided between the display panel and the transparent panel such that the image is viewed through the substrate; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the transparent panel and the substrate, wherein the transparent panel in allowed to be vibrated by the sound transferred to the space from the electric-mechanical-acoustic-transducer and the acoustic signal transfer member.

In one embodiment of the invention, the electronic device further includes a control section for controlling an operation of the electronic device. The transparent panel also acts as a touch panel for detecting a contact of a contact member with a position of the transparent panel corresponding to an operation menu icon displayed in the display panel. The control section causes the electronic device to operate in accordance with the operation menu icon corresponding to the position of the transparent panel which is in contact with the contact member.

In one embodiment of the invention; the electronic device further includes a first transparent electrode having an electric resistance and provided on a surface of the transparent panel facing the substrate; and a second transparent electrode having an electric resistance and provided on a surface of the substrate facing the transparent panel.

According to still another aspect of the invention, an electronic device includes a speaker system; and a housing for supporting the speaker system. The speaker system includes a panel; an electric-mechanical-acoustic-transducer having a diaphragm for outputting a sound by vibrating the diaphragm in accordance with an electric signal; and an acoustic signal transfer member for transferring the mound output from the electric-mechanical-acoustic-transducer to a space provided between the panel and the housing. The panel is allowed to be vibrated by the sound transferred to the space from the electric-mechanical-acoustic-transducer via the acoustic signal transfer member. The electronic device further includes a control section for controlling an operation of the electronic device. The panel also acts as a touch panel for detecting a contact of a contact member with a position of the panel corresponding to an operation menu provided on the panel. The control section causes the electronic device to operate in accordance with an item of the operating menu corresponding to the position of the panel which is in contact with the contact member.

According to still another aspect of the invention, an electronic device includes a speaker system; and a housing for supporting the speaker system. The speaker system includes a panel a substrate provided so as to face the panels an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the panel and the substrate the panel is allowed to be vibrated by the sound transferred to the space from the electric-mechanical-acoustic-transducer via the acoustic signal transfer member. The electronic device further includes a control section for controlling an operation of the electronic device. The panel also acts as a touch panel for detecting a contact of a contact member with a position of the panel corresponding to an item of an operation menu provided on the panel. The control section causes the electronic device to operate in accordance with the item of the operation menu corresponding to the position of the panel which is in contact with the contact member.

In one embodiment of the invention, the electric signal represents at least one of a received sound, a call arrival sound, and audio information for a plurality of channels. When the electric signal represents at least one of the received sound and the call arrival sound, the electric signal is input to the electric-mechanical-acoustic-transducers. When the electric signal represents the audio information for the plurality of channels, an electric signal representing audio information for each of the plurality of channels is input to the respective electric-mechanical-acoustic-transducer.

In one embodiment of the invention the speaker system includes at least one more electric-mechanical-acoustic-transducer, and at least one more acoustic signal transfer member, and the electric-mechanical-acoustic-transducers each include a diaphragm and each output a sound by vibrating the diaphragm in accordance with an electric signal. The acoustic signal transfer members each transfer the sound output from the respective electric-mechanical-acoustic-transducer to the space. The acoustic signal transfer members are connected to the space at different positions. When the electric signal represents at least one of the received sound and the call arrival sound, the electric signal is input to the electric-mechanical-acoustic-transducers. When the electric signal represent the audio information for the plurality of channels, an electric signal representing audio information for each of the plurality of channels is input to the respective electric-mechanical-acoustic-transducer.

In one embodiment of the invention, the electric signal represents at least one of a received sound, a call arrival sound, and audio information for a plurality of channels. When the electric signal represents at least one of the received sound and the call arrival sound, the electric signal is input to the electric-mechanical-acoustic-transducers. When the electric signal represents the audio information for the plurality of channels, an electric signal representing audio information for each of the plurality of channels is input to a respective one of the electric-mechanical-acoustic-transducers.

Thus, the invention described-herein make possible the advantages of providing (1) a speaker system in which the position where an image is displayed to the user is the same as the position from which a sound is output to the user; and (2) a speaker system providing a higher level of freedom of location in an electronic device or a mobile terminal device.

These and other advantages of the present invention will become apparent to those skilled in the art upon reading and understanding the following detailed description with reference to the accompanying figures.

BRIEF DESCRIPTION OF THE DRAWINGS

FIG. 2 is a cross-sectional view of an electric-mechanical-acoustic-transducer included in the speaker system according to the first example;

DESCRIPTION OF THE PREFERRED EMBODIMENTS

Hereafter, the present invention will be described by way of illustrative example with reference to the accompanying drawings.

EXAMPLE 1

Figure 1A:
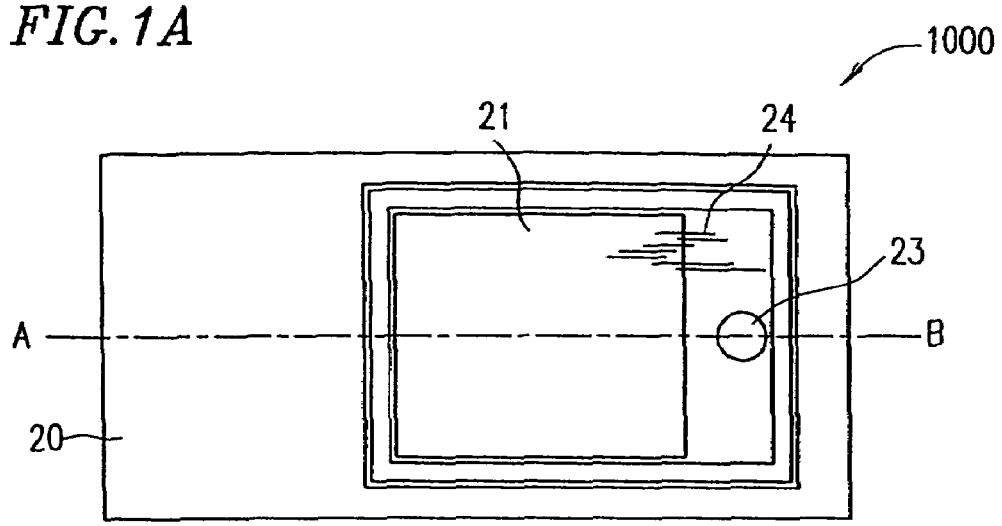
FIG. 1A is a plan view of a speaker system according to a first example of the present invention.
Figure 1B:
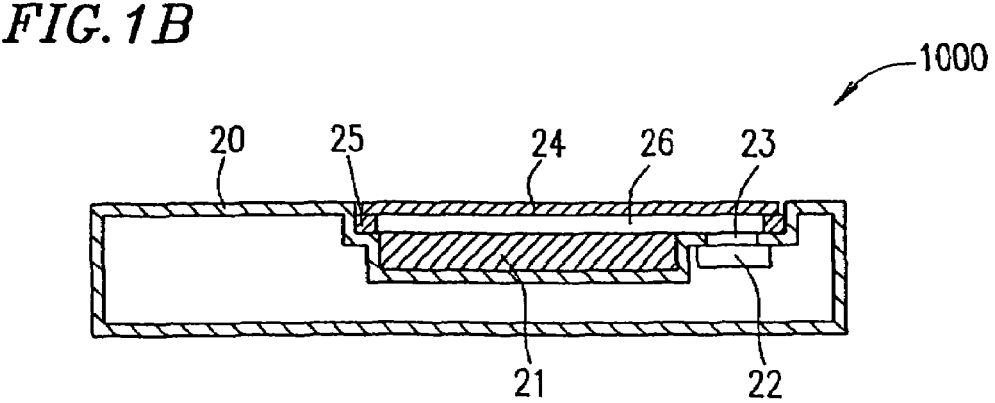
FIG. 1B is a croon-sectional view of the speaker system taken along chain line A-H shown in FIG. 1A.

A speaker system 1000 according to a first example of the present invention will be described with reference to FIGS. 1A and 1B. FIG. 1A is a plan view of the speaker system 1000, and FIG. 1B is a cross-sectional view of the speaker system 1000 taken along chain line A-B shown in FIG. 1A.

The speaker system 1000 includes a display panel 21 for displaying an image, a transparent panel 24 located so as to allow an image displayed in the display panel 21 to be viewed through the transparent panel 24, an electric-mechanical-acoustic-transducer 22 having a diaphragm 45 (FIG. 2) for vibrating the diaphragm 45 in accordance with an electric signal so as to output a sound. an elastic member 25 connected to a peripheral portion of the transparent panel 24, and a housing 20 for supporting the transparent panel 24 and the display panel 21

The speaker system 1000 has a space 26 between the display panel 21 and the transparent panel 24. The space 26 is preferably a closed space. The housing 20 has a sound hole 23. The housing 20 acts as an acoustic signal transfer member for transferring the sound output from the electric-mechanical-acoustic-transducer 22 to the space 26. The peripheral portion of the transparent panel 24 is supported by the elastic member 26, and thus the transparent panel 24 can be vibrated by the sound transferred from the electric-mechanical-acoustic-transducer 22 to the space 26 via the sound hole 23. The housing 20 supports the transparent panel 24 via the elastic member 25. The transparent panel 24 has an area which is larger than the area of the diaphragm 45. The display panel 21 is, for example, a liquid crystal display. The transparent panel 24 is formed of glass, an acrylic resin or other materials transmissive with respect to visible light.

FIG. 2 is a cross-sectional view of the electric-mechanical-acoustic-transducer 22. In this example, the electric-mechanical-acoustic-transducer 22 is a dynamic speaker.

The electric-mechanical-acoustic-transducer 22 includes a cup-shaped yoke 40, a magnet 41 provided an a central part of the yoke 40, a plate 42 provided on a top surface of the magnet 41, a voice coil 44 inserted into a magnetic gap 43 between the yoke 40 and the plate 42, the diaphragm 45 connected to the voice coil 44, and a housing 46 for supporting a peripheral portion of the diaphragm 45. The yoke 40 is provided on a central part of the housing 46. The housing 46 is connected to the housing 20 such that the diaphragm 45 and the sound hole 23 face each other.

An exemplary operation of the speaker system 1000 will be described.

When an electric signal is applied to the voice coil 44 inserted into the magnetic gap 43, a driving force lie generated in the voice coil 44. Then, the diaphragm 45 connected to the voice coil 44 is vibrated. Thus, a sound generated. The sound generated by the diaphragm 45 is transferred to the space 26 via the sound hole 23. The transparent panel 24 supported by the elastic member 25 in the peripheral portion thereof la vibrated by the pressure of the sound transferred to the space 26 and thus generates a sound.

Figure 3:
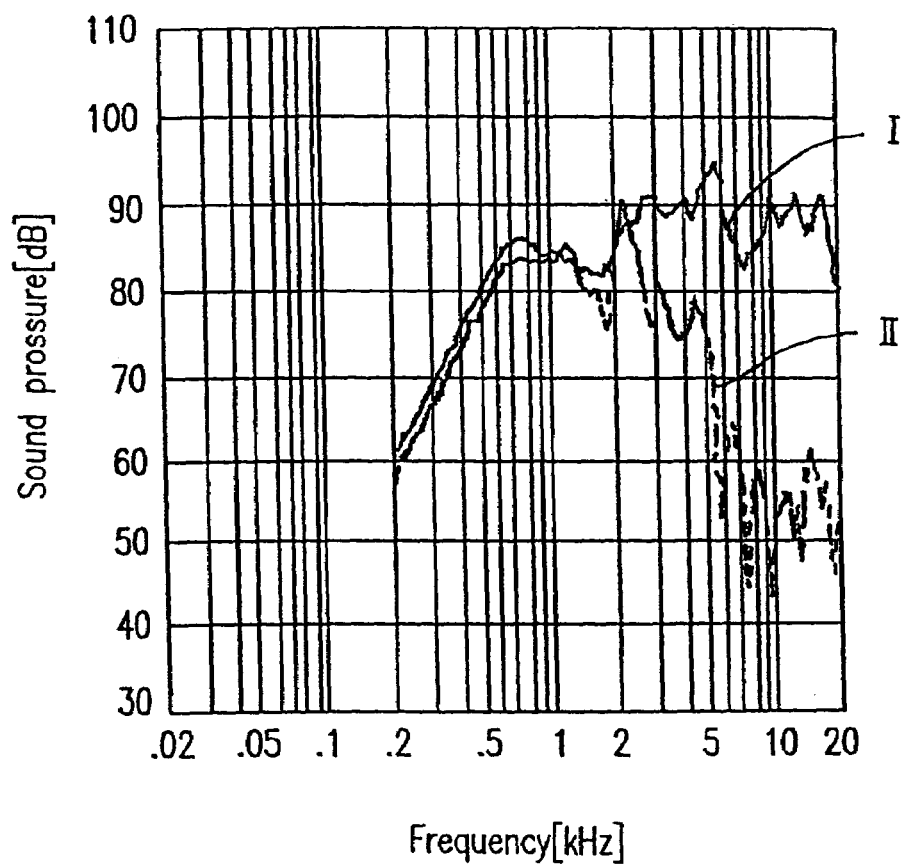
FIG. 3 is a graph illustrating a sound pressure vs. frequency characteristic of the speaker system according to the first example.

FIG. 3 is a graph illustrating measuring results of a sound pressure vs. frequency characteristic of the speaker system 1000. The measurement wag performed as follows. An the electric-mechanical-acoustic-transducer 22, a dynamic speaker having a speaker diameter of 18 mm was used. As the transparent panel 24, a transparent acrylic resin plate having a length of 60 mm, a width of 35 mm and a thickness of 1.7 mm was used. A microphone was placed at a position 0.1 m away from the speaker system 1000. A power of 0.1 W was applied to the electric-mechanical-acoustic-transducer 22.

Characteristic curve I in FIG. 3 represents a sound output only from the electric-mechanical-acoustic-transducer 22 in the absence of the transparent panel 24 (comparative example). Characteristic curve II represents a sound output from the transparent panel 24 (the present invention). The sound level of characteristic curve II is lower then that of characteristic curve I in a high frequency range of 3 kHz or higher.

The reduction in the sound pressure an be alleviated by adjusting the acoustic capacitance of the space 26 or by adjusting the weight of the transparent panel 24. More specifically, the sound pressure level can be raised in the above-described high frequency range by decreasing the acoustic capacitance of the space 26 by reducing the width of the space 26 between the display panel 21 and the transparent panel 24 The sound pressure level can be raised in the above-described high frequency range also by reducing the weight of the transparent panel 24. The high frequency characteristic of the speaker System 1000 can be controlled by forming the transparent panel 24 of a material having a relatively small specific gravity or by adjusting the thickness of the transparent panel 24. The width of the space 26 and the weight of the transparent panel 24 are adjusted in accordance with the bandwidth of the frequency range of the sound to be reproduced.

In the dynamic speaker having the speaker diameter of 18 mm used as the electric-mechanical-acoustic-transducer 22, the diaphragm 45 was formed of an acrylic film having a thickness of 20 μm and a weight of about 6 mg. The voice coil 44 Was formed of a copper wire having a diameter of 0.055 mm and a weight of 25 mg. The diameter of the voice coil 44 was 8 mm.

The transparent panel 24 formed of an acrylic resin (length; 60 mm; width 35 mm; thickness: 1.7 mm) weighed about 4200 mg. The ratio of the weight of the transparent panel 24 to the total weight of the diaphragm 45 and the voice coil 44 is 4200mg/(6 mg+25 mg)=about 135. The weight of the transparent panel 24 is about 135 times the total weight of the diaphragm 45 and the voice coil 44. Therefore, in the case where the voice coil 44 is connected to the transparent panel 24 (comparative example), the transparent panel 24 cannot be substantially vibrated directly by the voice coil 44. As a result, substantially no sound is generated from the transparent panel 24.

In the speaker system 1000 in this example; the heavy transparent panel 24 can be sufficiently vibrated by a small force, by the following principle. When the voice coil 44 drives the diaphragm 45 and thus the diaphragm 45 applies a pressure to the space 26, the pressure applied to the space 26 is transferred to the transparent panel 24. Thus, the transparent panel 24 vibrates. Where $S_1$ is the effective vibration area of the diaphragm 45, $S_2$ is the vibration area of the transparent panel 24, and $M_2$ is the weight of the transparent panel 24, the equivalent weight of the transparent panel 24 with respect to the voice coal 44 is $M_2/(S_2/S_1)^2$, owing to the effect of the acoustic transformer.

In the above-described example, the effective vibration area of the diaphragm 45 ($S_1$) is 98.5 mm and the vibration area of the transparent panel 24 ($S_2$) in 2100 mm². (Assuming that the effective radius of vibration of the diaphragm 45 is from the center of the edge portion to a substantially central position of the diaphragm 45, the effective radius of vibration of the diaphragm 45 is 5.6 mm although the apparent diameter of the diaphragm 46 is 18 mm.) The equivalent weight of the transparent panel 24 with respect to the voice coil 44 is 4200 mg/(2100 mm²/98.5 mm²)²=9.2 mg. The sum of the total weight or the diaphragm 45 and the voice coil 44 and the equivalent weight of the transparent panel 24 is 6 mg+25 mg+9.2 mg=40.2 mg. Accordingly, the transparent panel 24 can be vibrated by a force which can vibrate an object having a weight of 40.2 mg (total weight of the diaphragm 45, the voice coil 44 and the transparent panel 24. The weight of the 40.2 mg is about 1.3 times the total weight of the diaphragm 46 and the voice coil 44 (31 mg). Therefore, the transparent panel 24 can be sufficiently vibrated by the force generated in the voice coil 44.

In this manner, the electric-mechanical-acoustic-transducer 22 vibrates the transparent panel 24 via the space 26. Thus, the speaker system 1000, in which the transparent panel 24 having a large area and a great weight is vibrated by a small force us a diaphragm for reproducing an acoustic signal, can be realized.

The transparent panel 24 is transmissive with respect to visible light, and therefore can reproduce an acoustic signal without shielding the image displayed in the display panel 21. The transparent panel 24 is located such that the image displayed in the display panel 21 can be viewed through the transparent panel 24. Therefore, the position where the image is displayed to the user can be the same as the position from which a sound is output to the user. Owing to such a structure, the user does not have any sense of unnaturalness. The system 1000 having such a structure may be mounted an an electronic device or a mobile terminal device (e.g., a personal computer, a TV, a game machine, or a cellular phone) including an image or sound signal processing circuit.

The transparent panel 24 in supported by the elastic member 25, and thus the entire surface of the transparent panel 24 in vibrated by the pressure of the sound generated by the electric-mechanical-acoustic-transducer 22. Therefore, the acoustic characteristics such as, for example, the reproduction sound volume and the reproduction frequency band can be improved. Especially, the reproduction frequency band in a low frequency range can be expanded.

In the first example, the electric member 25 for supporting the peripheral portion of the transparent panel 24 is provided on a bottom surface of the transparent panel 24. Alternatively, the elastic member 25 may be provided so as to cover a side surface of the peripheral portion of the transparent panel 24. The space 26, surrounded by the transparent panel 24, the display panel 21, the elastic member 25, the housing 20 and the electric-mechanical-acoustic-transducer 22, preferably maintains a high level of air tightness in order to prevent the sound output from the diaphragm 46 from leaking outside.

In the first example, a dynamic speaker is used as the electric-mechanical-acoustic-transducer 22. Alternatively, any type of speaker which outputs a sound from diaphragm is usable, an a substantially the same effect is provided. Exemplary speakers usable include an electromagnetic speaker, a piezoelectric speaker, and a static speaker. The electric-mechanical-acoustic-transducer 22 may be round, elliptic or rectangular. When the electric-mechanical-acoustic-transducer 22 is elliptic or rectangular, the space in which the display panel 21 can be provided is enlarged, i.e., the planar size of the display panel 21 can be increased.

EXAMPLE 2

Figure 4:
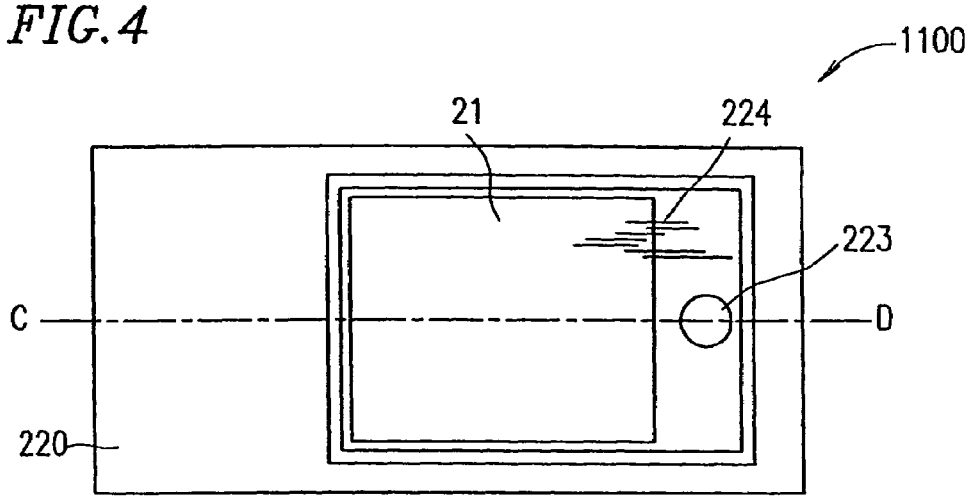
FIG. 4 is a plan view of a speaker system according to a second example of the present invention.
Figure 5:
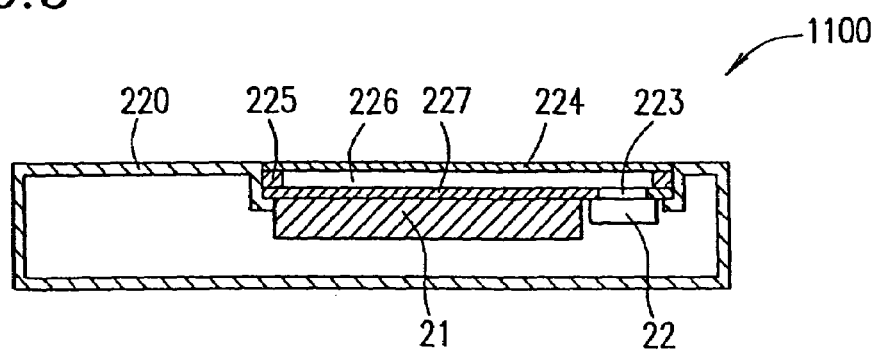
FIG. 5 is a cross-sectional view of the speaker system taken along chain line C-D shown in FIG. 9.

A speaker system 1100 according to a second example of the present invention will be described with reference to FIGS. 4 and 5. FIG. 4 is a plan view of the speaker system 1100, and FIG. 5 is a cross-sectional view of the speaker system 1100 taken along chain line C-D shown in FIG. 4.

The speaker system 1100 include a display panel 21 for displaying an image, a transparent panel 224 located so as to allow an image displayed in the display panel 21 to be viewed through the transparent panel 224, a transparent substrate 227 located between the display panel 21 dad the transparent panel 224 so as to allow an image displayed in the display panel 21 to be viewed through the substrate 227, an electric-mechanical-acoustic-transducer 22 having a diaphragm 45 (FIG. 2) for vibrating the diaphragm 45 in accordance with an electric signal so an to output a sound, a spacer (elastic member) 225 for connecting a peripheral portion of the transparent panel 224 and a peripheral portion of the substrate 227, and a housing 220 for supporting the substrate 227.

The speaker system 1100 has a space 226 between the substrate 227 and the transparent panel 224. The space 226 is preferably a closed space. The substrate 227 has a sound hole 223. The substrate 227 acts as an acoustic signal transfer member for transferring the sound output from the electric-mechanical-acoustic-transducer 22 to the space 226. The transparent panel 224 can be vibrated by the sound transferred from the electric-mechanical-acoustic-transducer 22 to the space 226 via the sound hole 223. The substrate 227 supports the transparent panel 224 via the spacer 225. The transparent panel 224 hag an area which is larger than the area of the diaphragm 45. In this example, the transparent panel 24 is a film which is formed of, for example, PET (polyethylene terephthalate), acrylic resins, or otter resin materials transmissive with respect to visible light.

The electric-mechanical-acoustic-transducer 22 has substantially the same structure as that described in the first example, except that the housing 46 is connected to the substrate 227 such that the diaphragm 45 faces the sound hole 223.

An exemplary operation of the speaker system 1100 will be described.

When an electric signal is applied to the voice coil 44 inserted into the magnetic gap 43, a driving force is generated in the voice coil 44. Then, the diaphragm 45 connected to the voice coil 44 is vibrated. Thus, a sound is generated. The sound generated by the diaphragm 45 is transferred to the space 226 via the sound hole 223. The transparent panel 224 supported by the spacer 225 in the peripheral portion thereof is vibrated by the pressure of the sound transferred to the space 226 and thus generates a sound.

Figure 6:
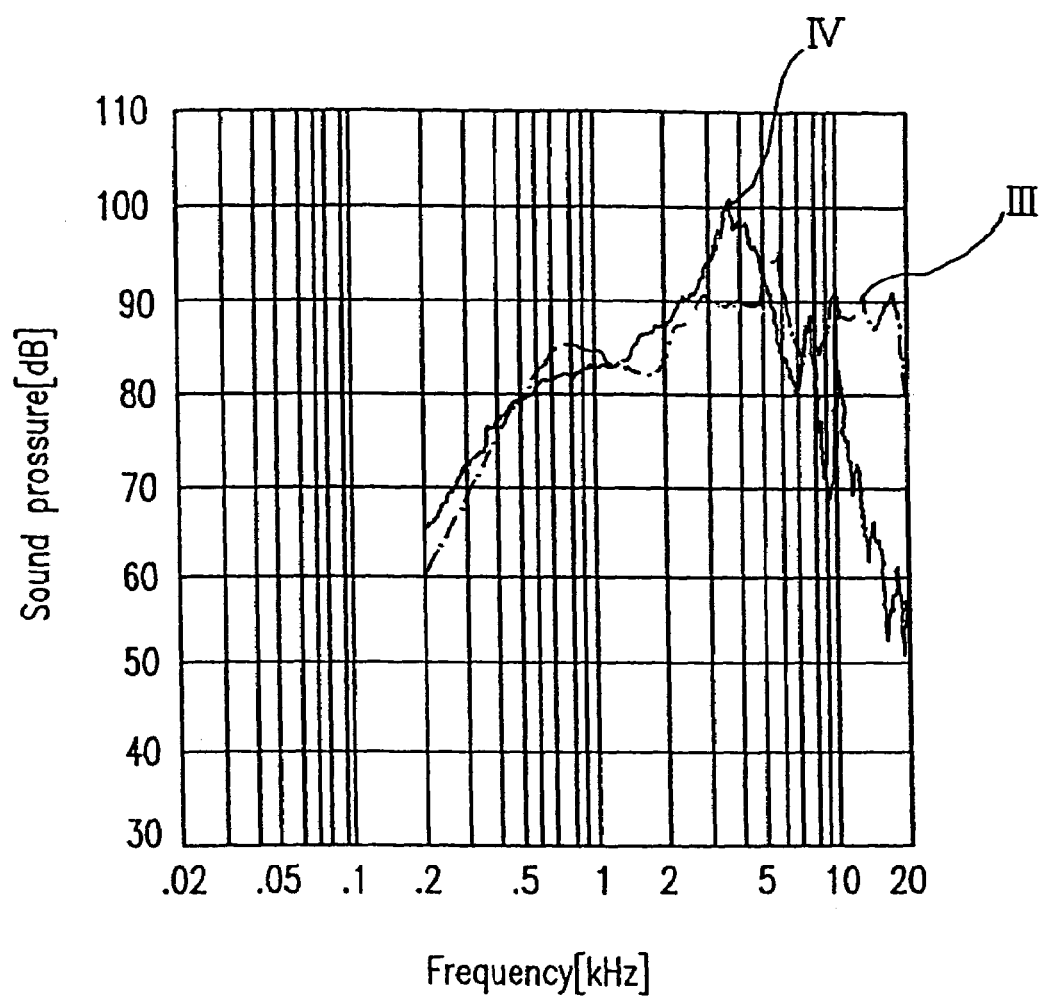
FIG. 6 in a graph illustrating a sound pressure vs. frequency characteristic of the speaker system according to the second example.

FIG. 6 is a graph illustrating measuring results of a sound pressure vs. frequency characteristic of the speaker system 1100. The measurement was performed as follows. As the electric-mechanical-acoustic-transducer 22, a dynamic speaker having a speaker diameter of 18 mm was used. As the transparent panel 224, a transparent PET plate having a length of 90 mm, a width of 60 mm and a thickness of 0.1 mm was used. A microphone was placed at a position 0.1 mm away from the speaker system 1100. A power of 0.1 W was applied to the electric-mechanical-acoustic-transducer 22.

Characteristic curve III in FIG. 6 represents a sound output only from the electric-mechanical-acoustic-transducer 22 in the absence of the transparent panel 224 (comparative example). Characteristic curve IV represents a sound output from the transparent panel 224 (present invention).

In the dynamic speaker having the speaker diameter of 18 mm used as the electric-mechanical-acoustic-transducer 22, the diaphragm 45 was formed of an acrylic film having a thickness of 20 μm and a weight of about 6 mg. The voice coil 44 was formed of a copper wire having a diameter of 0.055 mm and a weight of 25 mg. The diameter of the voice coil 44 was 8 mm.

The transparent panel 224 formed of PET (length; 90 mm: width: 60 mm; thickness: 0.1 mm) weighed about 700 mg. The ratio of the weight of the transparent panel 224 to the total weight of the diaphragm 45 and the voice coil 44 is 700 mg/(6 mg+25 mg)=about 22.6 mg. The weight of the transparent panel 224 is about 22.6 times the total weight of the diaphragm 45 and the voice coil 44. Therefore, in the case where the voice coil 44 is connected to the transparent panel 224 (comparative example), the transparent panel 224 cannot be substantiality vibrated directly by the voice coil 44. An a result, substantially no sound is generated from the transparent panel 224.

In the speaker system 1100 in this example, the heavy transparent panel 224 can be sufficiently vibrated by a small forces, by the following principle. When the voice coil 44 drives the diaphragm 45 and thus the diaphragm 45 applies a pressure to the space 226, the pressure applied to the space 226 is transferred to the transparent panel 224. Thus, the transparent panel 224 vibrates. Where $S_1$ is the effective vibration area of the diaphragm 45, $S_2$ is the vibration area of the transparent panel 224, and $M_2$ in the weight of the transparent panel 224 (similarly to the first example), the equivalent weight of the transparent panel 224 with respect to the voice coil 44 is $M_2/(S_2/S_1)^2$, owing to the effect of the acoustic transformer.

In the above-described example, the effective vibration area of the diaphragm 45 ($S_1$) is 98.5 mm and the vibration area of the transparent panel 224 ($S_2$) is 5400 mm$^2$. (An described in the first example, the effective radius of vibration of the diaphragm 45 is 5.6 mm.) The equivalent weight or the transparent panel 224 with respect to the voice coil 44 is 700 mg/(5400 mm$^2$/98.5 m$^2$)$^2$=0.2 mg. The sum of the total weight of the diaphragm 45 and the voice coil 44 and the equivalent weight of the transparent panel 224 is 6 mg+25 mg+0.2 mg=31.2 mg. Since the weight of 31.2 mg is substantially the came as total weight of the diaphragm 45 and the voice coil 44 (31 mg), the transparent panel 224 can be sufficiently vibrated by the force generated in the voice coil 44.

In this manner, the electric-mechanical-acoustic-transducer 22 vibrates the transparent panel 224 via the space 226. Thus, the speaker system 1100, in which the transparent panel 224 having a large area and a great weight in vibrated by a small force as a diaphragm for reproducing an acoustic signal, car be realized.

The transparent panel 224 and the transparent substrate 227 are transmissive with respect to visible light and therefore an acoustic signal can be reproduced without the image displayed in the display panel 21 being shielded. The transparent panel 224 in located such that the image displayed in the display panel 21 can be viewed through the transparent panel 224. Therefore, the position where the image is displayed to the user can be the game is the position from which a sound is output to the user. Owing to such a structure, the user does not have any sense of unnaturalness. The system 1100 having such a structure may be mounted on an electronic device or a mobile terminal device (e.g., a personal computer, a TV, a game machine, or a cellular phone) including an image or sound signal processing circuit.

The substrate 227 is provided between the display panel 21 and the transparent panel 224. Since the substrate 227 protects the display panel 21 against external impacts, the transparent panel 224 can be thinner. Therefore, the acoustic characteristics such as, for example, the reproduction sound volume and the reproduction frequency band can be improved. Especially, the reproduction frequency band in a low frequency range can be expanded.

During the production process of the speaker system 1100, the space 226 may be formed in advance between the transparent panel 224 and the substrate 227. In this case, precise positioning between the transparent panel 224 and the substrate 227/display panel 21 is not necessary. This simplifies the process for mounting the speaker system 1100 on an electronic device or a mobile terminal device.

The space 226, surrounded by the transparent panel 224, the substrate 227, the spacer 225 and the electric-mechanical-acoustic-transducer 22, preferably maintains a high level of air tightness in order to prevent the sound output from the diaphragm as from leaking outside. This can be realized by, for example, bonding the transparent panel 224, The substrate 227, the spacer 225 and the electric-mechanical-acoustic-transducer 22 together.

In the second example, a dynamic speaker is used as the electric-mechanical-acoustic-transducer 22 Alternatively, any type of speaker which outputs a sound from a diaphragm is usable and substantially the same effect is provided. Exemplary speaker usable include an electromagnetic speaker, a piezoelectric speaker, and a static speaker. The electric-mechanical-acoustic-transducer 22 may be round, elliptic or rectangular. When the electric-mechanical-acoustic-transducer 22 is elliptic or rectangular, the space in which the display panel 21 can be provided it enlarged, i.e., the planar size of the display panel 21 can be increased.

EXAMPLE 3

Figure 7A:
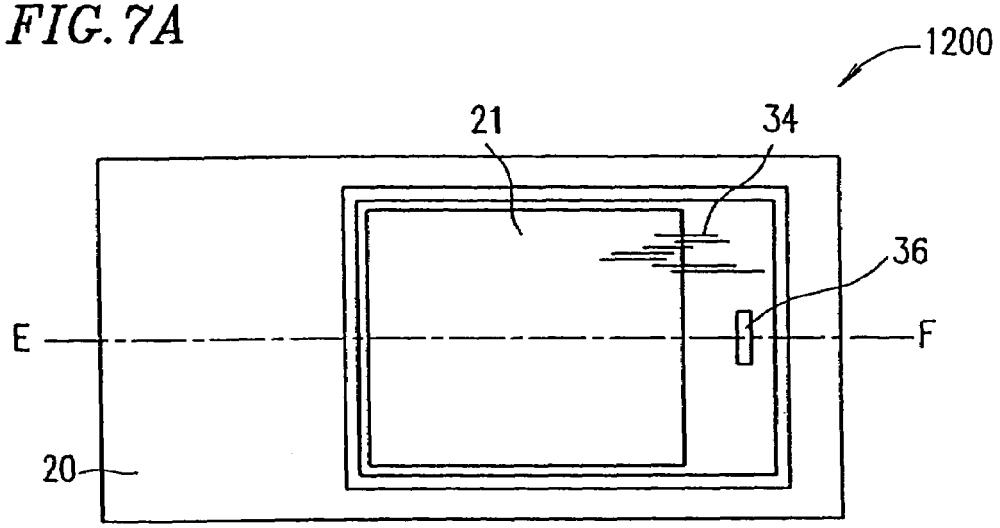
FIG. 7A is a plan view of a speaker system according to a third example of the present invention.
Figure 7B:
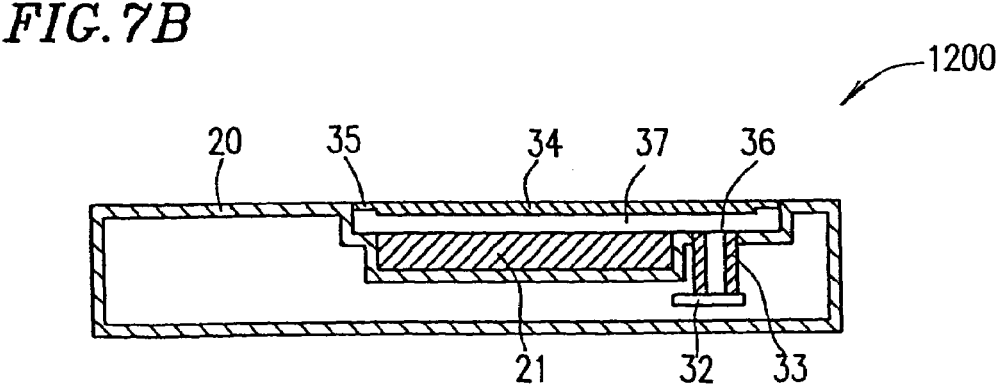
FIG. 7B is a cross-sectional View of the speaker system taken along chain line E-F shown in FIG. 7A.

A speaker system 1200 according to a third example of the present invention will be described with reference to FIGS. 7A and 7B. FIG. 7A is a plan view of the speaker system 1200, and FIG. 7B is a cross-sectional view of the speaker system 1200 taken along chain line E-F shown in FIG. 7A.

The speaker system 1200 includes a display panel 21 for displaying an image, a transparent panel 34 located go as to allow an image displayed in the display panel 21 to be viewed through the transparent panel 34, an electric-mechanical-acoustic-transducer 32 having a diaphragm 52. (FIG. 8) for vibrating the diaphragm 52 in accordance with an electric signal so as to output a sound, an acoustic pipe 33 Connected to the electric-mechanical-acoustic-transducer 32, and a housing 20 for supporting the transparent panel 34 and the display panel 21.

The speaker system 1200 has a space 37 between the display panel 21 and the transparent panel 34. The space 37 is preferably a closed space. The housing 20 is connected to the acoustic pipe 33 via an opening 36 of the acoustic pipe 33. The acoustic pipe 33 acts as an acoustic signal transfer member for transferring the sound output from the electric-mechanical-acoustic-transducer 32 to the space 37. The transparent panel 34 has a peripheral portion 35 which is thinner than a central portion thereof. The peripheral portion 35 is in the form of a film. The peripheral portion 36 is supported by the housing 20. The transparent panel 34 can be vibrated by the sound transferred from the electric-mechanical-acoustic-traducer 32 to the space 37 via the acoustic pipe 33. The transparent panel 34 has an area which is larger than the area of the diaphragm 52. The transparent panel 34 is formed of glass, an acrylic resin or other materials transmissive with respect to visible light.

Figure 8:
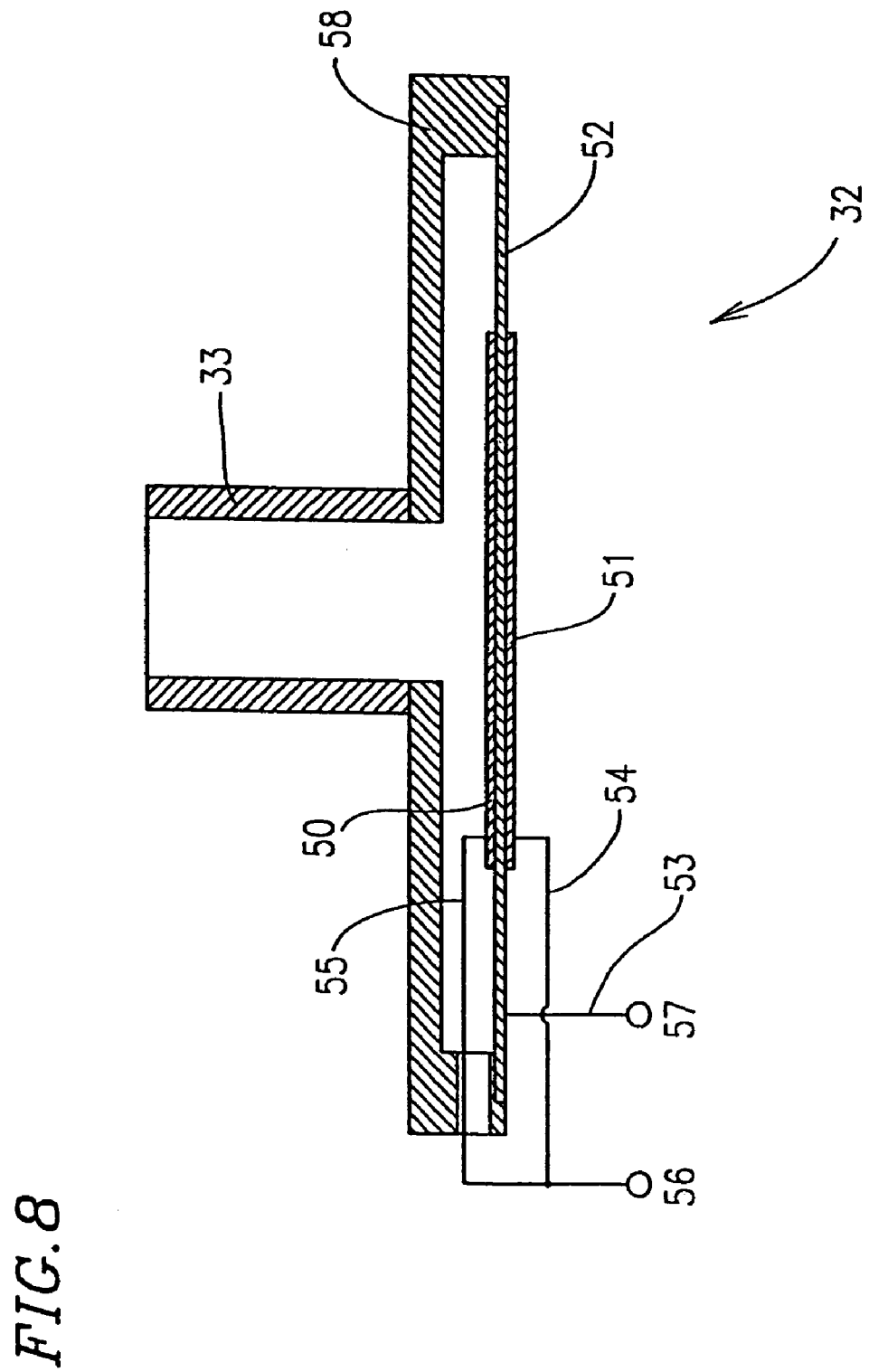
FIG. 8 is a crone-sectional view of an electric-mechanical-acoustic-transducer included in the speaker system according to the third example.

FIG. 8 is a cross-sectional view of the electric-mechanical-acoustic-transducer 32. In this example, the electric-mechanical-acoustic-transducer 32 is a piezoelectric speaker, so that the electric-mechanical-acoustic-transducer 32 can be thinner.

The electric-mechanical-acoustic-transducer 32 includes piezoelectric elements 50 and 51, the diaphragm 52 having the piezoelectric elements 50 and 51 bonded to both surfaces thereof, a lead 53 connected to an input terminal 57 and the diaphragm 52 for receiving an electric signal, a lead 54 connected to an input terminal 56 and the piezoelectric element 51, a lead 55 connected to the input terminal 56 and the piezoelectric element 50, and a housing 58 for supporting a peripheral portion of the diaphragm 52. The diaphragm 52 contains a conductive material of phosphor bronze, stainless steel or the like, and acts as an intermediate electrode. The housing 55 is connected to the acoustic pipe 33.

An exemplary operation of the speaker system 1200 will be described.

When an electric signal is applied to the input terminals 56 and 57, the piezoelectric elements 50 and 51 bonded on both surfaces of the diaphragm 52 are warped, and a sound is generated from the diaphragm 52 and the piezoelectric elements 50 and 51. The sound passes through the acoustic pipe 33 and is transferred to the space 37 via the opening 36. The transparent panel 34 supported by the housing 20 in the peripheral portion thereof is driven and vibrated by the pressure of the sound transferred to the space 37 and thus generates a sound. This manner of sound generation by the transparent panel 34 is substantially the same as that by the transparent panel 24 in the first example.

The speaker system 1200 in the third example is different from the speaker system 1000 in the first example in that the speaker system 1200 uses the acoustic pipe 33 as the acoustic signal transfer member for transferring the sound output from the electric-mechanical-acoustic-transducer 32 to the space 37. Such a structure allows the electric-mechanical-acoustic-transducer 32 to be provided closer to a bottom surface of the housing 20 with respect to the display panel 21. This increases a space in which the display panel 21 can be provided; i.e., increase the planar size of the display panel 21.

The opening 36 of the acoustic pipe 33 may have a rectangular shape, so that one of the aides of the display panel 21 which is adjacent to the opening 36 is parallel to the longitudinal direction of the opening 36. In this case, the planar size of the display panel 21 can be further increased.

The peripheral portion 35 of the transparent panel 34 may be integrally formed of the same material as that of the central portion of the transparent panel 34, or may be formed of a different material from that of the central portion of the transparent panel 34 and fixed to the central portion of the transparent panel 34.

The transparent panel 34 may be formed of a film entirely in addition to the peripheral portion 35. In this case, the entirety of the transparent panel 34 is driven by the sound output from the electric-mechanical-acoustic-transducer 32.

In the third example, a piezoelectric speaker is used as the electric-mechanical-acoustic-transducer 32. Alternatively, any type of speaker which output a sound from a diaphragm is usable and substantially the same effect is provided. Exemplary speaker unable include an electromagnetic speaker, a dynamic speaker, and a static speaker.

Figure 9A:
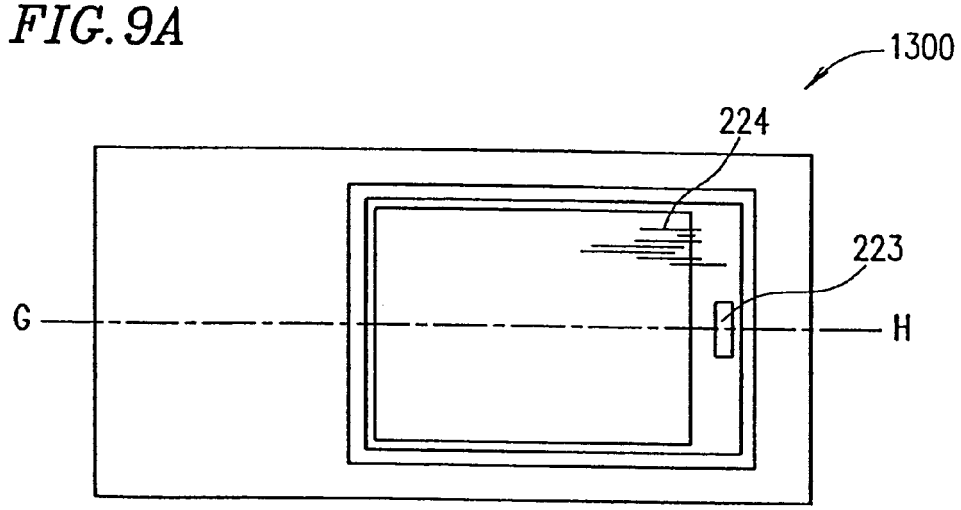
FIG. 9A is a plan view of another speaker system according to the third example of the present invention.
Figure 9B:
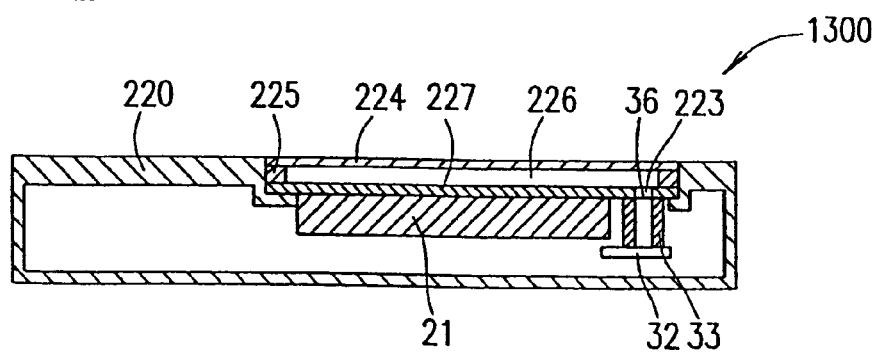
FIG. 9B is a cross-sectional view of the speaker system taken along chain line G-H shown in FIG. 9A.

Next, a speaker system 1300 as modification example of the speaker system 1100 in the second example of the present invention will be described with reference to FIGS. 9A and 9B. FIG. 9A is a plan view of the speaker system 1300, and FIG. 9B is a cross-sectional view of the speaker system 1300 taken along chain line G-H shown in FIG. 9A.

The speaker system 1300 includes the electric-mechanical-acoustic-transducer 32 and the acoustic pipe 33 connected to the electric-mechanical-acoustic-transducer 32, instead of the electric-mechanical-acoustic-transducer 22. The sound hole 223 of the substrate 227 is communicated to the opening 36 of the acoustic pipe 33. The acoustic pipe 33 acts as an acoustic signal transfer member for transferring the sound output from the electric-mechanical-acoustic-transducer 32 to the space 37.

An exemplary operation of the speaker system 1300 will be described.

When an electric signal is applied to the input terminals 56 and 57, the piezoelectric elements 50 and 51 bonded on both surfaces of the diaphragm 52 are warped, and a sound is generated from the diaphragm 52 and the piezoelectric elements 50 and 51. The sound passes through the acoustic pipe 33 and is transferred to the pace 226 via the opening 36. The transparent panel 224 is vibrated by the pressure of the sound transferred to the space 226 and thus generates a sound.

The speaker system 1300 uses the acoustic pipe 33 as the acoustic signal transfer member for transferring the sound output from the electric-mechanical-acoustic-transducer 32 to the space 226. Such a structure allows the electric-mechanical-acoustic-transducer 32 to be provided closer to a bottom surface of the housing 220 with respect to the display panel 21 This increases a space in which the display panel 21 can be provided; i.e., increases the planar size of the display panel 21.

The opening 36 of the acoustic pipe 33 may have a rectangular shape so that one of the sides of the display panel 21 which is adjacent to the opening 36 is parallel to the longitudinal direction of the opening 36. In this case, the planar size of the display panel 21 can be further increased.

In this example, a piezoelectric speaker 18 used as the electric-mechanical-acoustic-transducer 32. Alternatively, any type of speaker which outputs a sound from a diaphragm is usable, and substantially the same effect in provided. Exemplary speakers usable include an electromagnetic speaker, a dynamic speaker, and a static speaker.

EXAMPLE 4

Figure 10A:
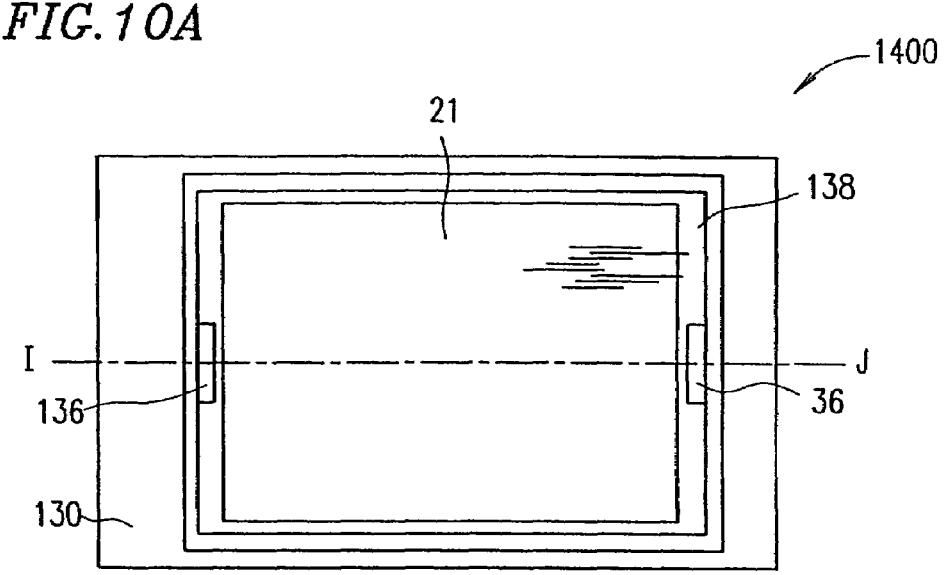
FIG. 10A is a plan view of a speaker system according to a fourth example of the present invention.
Figure 10B:
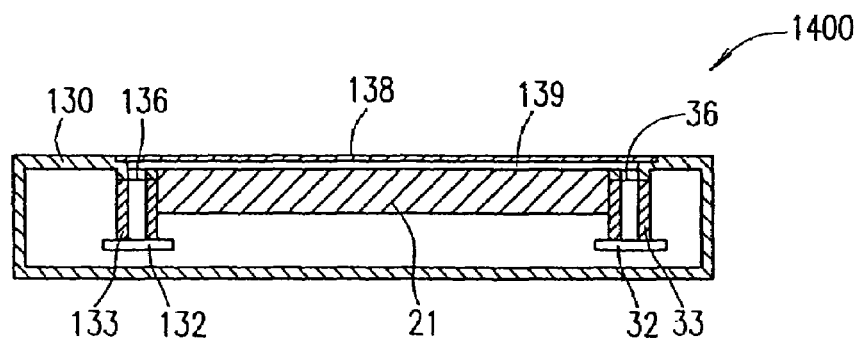
FIG. 10B is a cross-sectional view of the speaker system taken along chain line I-J shown in FIG. 10A.

A speaker system 1400 according to at fourth example of the present invention will be described with reference to FIGS. 10A and 10B. FIG. 10A in a plan view of the speaker system 1400, and FIG. 10B is a cross-sectional view of the speaker system 1400 taken along chain line I-J shown in FIG. 10A. The speaker system 1400 basically has the structure of the speaker system 1200 in the third example with a plurality of electric-mechanical-acoustic-transducer.

The speaker system 1400 includes a display panel 21 for displaying an image, a transparent panel 138 located so an to allow an image displayed in the display panel 21 to be viewed through the transparent panel 139, electric-mechanical-acoustic-transducers 32 and 132 each having a diaphragm 52 (FIG. 5) for vibrating the diaphragm 52 in accordance with an electric signal so au to output a sound, acoustic pipes 33 and 133, and a housing 130 for supporting the transparent panel 138, respectively connected to the electric-mechanical-acoustic-transducer 32 and 132, and the display panel 21.

The speaker system 1400 has a space 139 between the display panel 21 and the transparent panel 138. The space 139 is preferably a closed space. The housing 130 is connected to the acoustic pipe 33 via an opening 36 thereof and to the acoustic pipe 133 via an opening 136 thereof. The acoustic pipes 33 and 133 each act as an acoustic signal transfer member for transferring the sound output from the electric-mechanical-acoustic-transducers 32 and 132 to the space 139. The transparent panel 138 is supported by the housing 130 in a peripheral portion thereof, and can be vibrated by the sound transferred from the electric-mechanical-acoustic-transducers 32 and 132 to the space 139. The transparent panel 138 has an area which is larger than the area of the diaphragm 52. In this example, the transparent panel 138 is a film which is formed of, for example, PET (polyethylene terephthalate), or other resin materials transmissive with respect to visible light.

An exemplary operation of the speaker system 1400 will be described.

The speaker system 1400 in the four the example in different from the speaker system 1200 in the third example in that the speaker system 1400 includes the plurality of electric-mechanical-acoustic-transducers 32 and 132 and the plurality of acoustic pipes 32 and 133. The transparent panel 138 is entirely a film.

The electric-mechanical-acoustic-transducer 132 has the game structure as that of the electric-mechanical-acoustic-transducer 32 described in the third example. The electric-mechanical-acoustic-transducer 132 also operates in the same manner as the electric-mechanical-acoustic-transducer 32 described in the third example. The acoustic pipes 33 and 133 are respectively connected to the electric-mechanical-acoustic-transducer 32 and 132. The openings 36 and 136 of the acoustic pipes 33 and 133 are communicated with the space 139 at different positions from each other. The sound output from the electric-mechanical-acoustic-transducer 132 is transferred to the space 139 via the acoustic pipe 133. The transparent panel 138 is vibrated by the pressure of the sound transferred to the space 139 so as to generate a sound.

When, for example, an electric signal representing information for a right channel is input to the electric-mechanical-acoustic-transducer 32 and an electric signal representing information for a left channel is input to the electric-mechanical-acoustic-transducer 132, the sound for the right channel is transferred to the space 139 via the opening 36 and the sound for the left channel is transferred to the space 139 via the opening 136. Thus, the transparent panel 138 is vibrated by a synthesis sound pressure for the right and left channels. In this manner, a stereo reproduction is realized. Especially because the transparent panel 13 is a film in this example, portions of the transparent panel 138 which are immediately facing the openings 36 and 136 are vibrated by a sound of a high frequency range which has a short wavelength and narrow directivity. The entire transparent panel 138 is vibrated by a sound of a low frequency range which has a long wavelength and wide directivity. Even though the sound for the right channel and the sound for the left channel are synthesized in the space 139, the sound of the high frequency range which contributed to the expansion of the sound image is output from separate positions of the transparent panel 138. Thus. an effective stereo reproduction is realized by one transparent panel 138.

In the case where the speaker system 1400 is mounted on a mobile terminal device including a relatively large display panel such as, for example, a PDA (personal digital assistant), the openings 36 and 136 of the acoustic pipes 33 and 133 can be located on both ends of the display panel 21, i.e., away from each other by a relatively large distance. Therefore, a sound image of the sound output from the display panel 21 is enlarged, and thus a more effective stereo reproduction is provided.

The speaker system 1400 includes two electric-mechanical-acoustic transducers 32 and 132 in this example, but may include three or more electric-mechanical-acoustic-transducers. Each of the plurality of electric-mechanical-acoustic-transducers is connected to an acoustic pipe. Each acoustic pipe in communicated to the space 139 at different positions. In this case, the transparent panel 135 is vibrated by the plurality of electric-mechanical-acoustic-transducer, and therefore a sound of a higher volume is output from the transparent panel 138.

The display panel 21 may have an opening at top, bottom, right and left positions thereof. In this case, for example, the opening on the top and bottom positions may be used to transfer the sound output from the electric-mechanical-acoustic-transducer based on an electric signal representing audio information for one of multiple channels. Thus, a more realistic sound can be reproduced.

When the electric signal is a monaural signal, the Same electric signal may be input to the plurality of electric-mechanical-acoustic-transducers. Alternatively, the monaural signal may be input to one of the electric-mechanical-acoustic-transducer.

Figure 11:
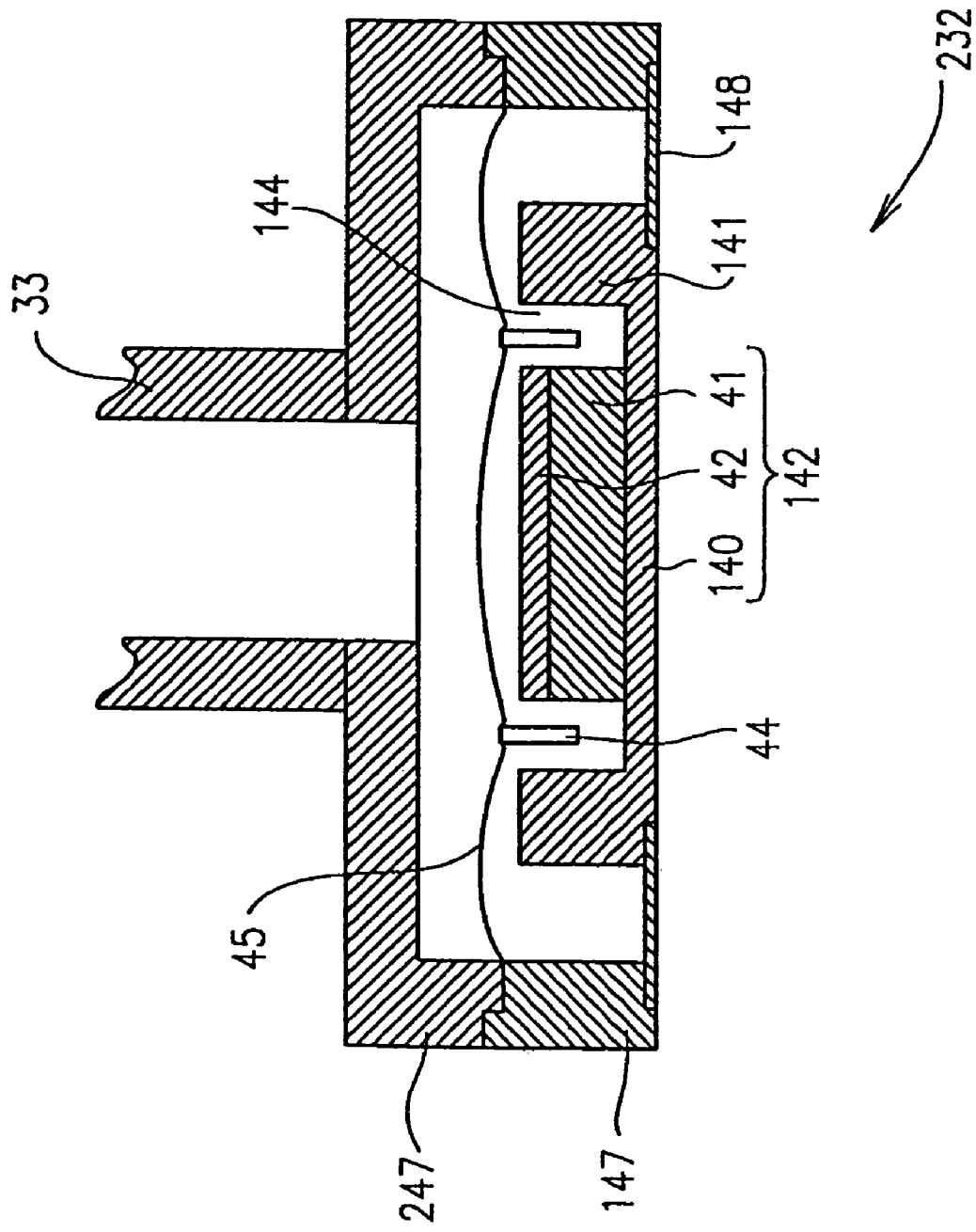
FIG. 11 is a cross-sectional view of an electric-mechanical-acoustic-transducer included in the speaker system according to the fourth example.

An electric-mechanical-acoustic-transducer 232 shown in FIG. 11 may be used instead of the electric-mechanical-acoustic-transducer 32. The electric-mechanical-acoustic-transducer 232 includes a cup-shaped yoke 140 having a spindle section 141 along a periphery thereof, a magnet 41 provided on a central part of the yoke 140, a plate 42 provided on a top surface of the magnet 41, a voice coil 44 inserted into a magnetic gap 144 between the yoke 140 and the plate 42, a diaphragm 45 connected to the voice coil 44, housings 147 and 247 for supporting a peripheral portion of the diaphragm 45, and a suspension 148 connected to a peripheral portion of the yoke 140 and a bottom surface of the housing 147. The housing 247 is connected to the acoustic pipe 33. A magnetic circuit 142 includes the yoke 140, the magnet 41, and the plate 42. Since the magnetic circuit 142 is supported by the suspension 148, the magnetic circuit 142 can be vibrated so as to generate a mechanical vibration simultaneously with, or independent from, the acoustic signal reproduction.

The electric-mechanical-acoustic-transducer 232 outputs a sound from the diaphragm 45 as described in the first example with reference to FIG. 2.

An exemplary operation of the magnetic circuit 142 for generating A mechanical vibration will be described.

A vibration function of an electric-mechanical-acoustic-transducer is disclosed by, for example, Japanese Laid-Open Publication No. 10-215499 and will not be described in detail here. When an electric signal is applied to the voice coil 44, a force is generated in the magnetic circuit 142 in the opposite direction to the force generated in the voice coil 44. The magnetic circuit 142 is supported by the housing 147 via the suspension 140. A mechanical resonating system includes the mass of the magnetic circuit 142 and the stiffness of the suspension 148. When the frequency of the electric signal applied to the voice coil 44 substantially matches the resonating frequency of the mechanical resonating system, the magnetic circuit 142 largely vibrates. This vibration is transferred to the housing 147 via the suspension 148. Since the housing 147 is mechanically coupled to the housing 130 via the housing 247 and the acoustic pipe 33, the vibration of the magnetic circuit 142 is transferred to the housing 130 so as to vibrate the housing 130.

As described above, the electric-mechanical-acoustic-transducer 232 has two functions of acoustic signal reproduction and generation of a mechanical vibration. For example, the spacer system 1400 may be used for a mobile terminal device having a signal receiving function, for example, a cellular phone. In this case, the mobile terminal device has both a function of a speaker of notifying the user of the signal reception by an acoustic signal of a melody or the like, and a function of a vibrator of notifying the user of the signal reception by a vibration transferred to the body of the user.

When an electronic device including the speaker system 1400 including the electric-mechanical-acoustic-transducer 232 is used to play a game or the like, the combination of a realistic sound effect and a vibration transferred to the user raise the level of excitement of the game.

Even when the electric signal is a monaural signal, the user feels the vibration in addition to hearing the acoustic signal reproduced from the same place of the transparent panel 130.

The electric-mechanical-acoustic-transducer 232 may be used instead of the electric-mechanical-acoustic-transducer 132. In the first through third examples, the electric-mechanical-acoustic-transducer 232 may be used instead of each of the electric-mechanical-acoustic-transducers 22 and 32.

Figure 12:
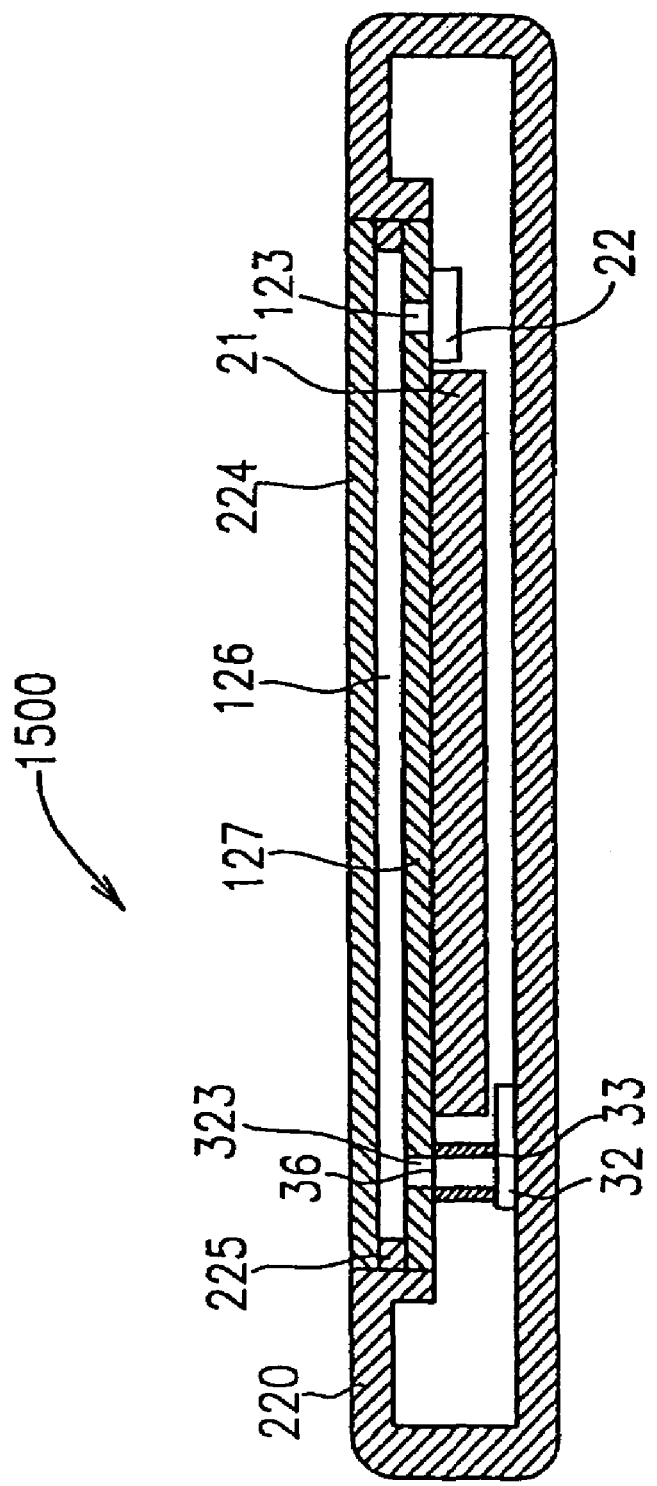
FIG. 12 is a cross-sectional view or another speaker system according to the fourth example of the present invention.

Next, a speaker system 1500 as a modification example of the speaker system 1100 in the second example of the present invention will be described with reference to FIG. 12.

The speaker system 1500 includes the electric-mechanical-acoustic-transducer 32 and the acoustic pipe 33 shown in FIG. 9B in addition to the structure of the speaker system 1100. The acoustic pipe 33 is connected to the electric-mechanical-acoustic-transducer 32. A substrate 127, which is provided instead of the substrate 227, has sound holes 123 and 323. The electric-mechanical-acoustic-transducer 22 is connected to the substrate 127 via the sound hole 123, and the opening 36 of the acoustic pipe 33 is communicated to the sound hole 323. In this example, the transparent panel 224 is formed of a film. A space 126 is formed between the substrate 127 and the transparent panel 224. The space 126 is preferably a closed space.

An exemplary operation of the speaker system 1500 will be described.

The electric-mechanical-acoustic-transducers 22 and 32 operate as described in the first and third examples. The sound output from the electric-mechanical-acoustic-transducer 22 is transferred to the space 126 via the sound hole 123. The sound output from the electric-mechanical-acoustic-transducer 32 is transferred to the space 126 via the acoustic pipe 33. The transparent panel 224 is vibrated by the pressure of the sound transferred to the space 126 so as to generate a sound.

When, for examples, an electric signal representing information for a right channel is input to the electric-mechanical-acoustic-transducer 22 and an electric signal representing information for a left channel is input to the electric-mechanical-acoustic-transducer 32, the sound for the right channel is transferred from the electric-mechanical-acoustic-transducer 22 to the space 126 and the sound for the left channel in transferred from the electric-mechanical-acoustic-transducer 32 to the signal 126 Thus, the transparent panel 224 is vibrated by a synthesis sound pressure for the right and left channels. In this manner, a stereo reproduction in realized. Especially because the transparent panel 224 is a film in this example, portions of the transparent panel 224 which are immediately facing the openings 123 and 323 are vibrated by a sound of a high frequency range which has a short wavelength and narrow directivity. The entire transparent panel 224 in vibrated by a sound of a low frequency range which has a long wavelength and wide directivity. Even though the sound for the right channel and the sound for the left channel are synthesized in the space 126, the sound of the high frequency range which contributes to the expansion of the sound image is output from separate positions of the transparent panel 224. Thus, on effective stereo reproduction is realized by one transparent panel 224.

In the case where the acoustic pipe 33 is connected to the electric-mechanical-acoustic-transducer 32 at a position off the center of the electric-mechanical-acoustic-transducer 32, the electric-mechanical-acoustic-transducer 32 can be efficiently provided in an empty space in the housing 220. The empty space in the housing 220 can also be efficiently formed in the housing 220. In this empty space, an electric circuit such as, for example, a signal receiving circuit, can be provided as wall as the electric-mechanical-acoustic-transducer 32.

The electric-mechanical-acoustic-transducers 22 and 32 may both be a dynamic speaker or a piezoelectric speaker.

An electric-mechanical-acoustic-transducer 232 may be used instead of each of the electric-mechanical-acoustic-transducer 22 and 32.

An acoustic pipe may be provided between the electric-mechanical-acoustic-transducer 22 and the sound hole 123. The electric-mechanical-acoustic-transducer 32 may be directly connected to the substrate 127 with the acoustic pipe 33 being omitted.

The speaker system 1500 in the example includes two electric-mechanical-acoustic-transducers 22 and 32 and one acoustic pipe 33, The speaker system 1500 may include three or more electric-mechanical-acoustic-transducers and three or more acoustic pipe.

The electric-mechanical-acoustic-transducers 22, 32 and 132 each may be a dynamic speaker, an electromagnetic speaker, a piezoelectric speaker, a static speaker or any type of speaker which outputs a sound from a diaphragm.

In the speaker system 1400 and 1500, the electric signal represents at least one of a received sound, a call arrival sound, and audio information for a plurality of channels. When the electric signal represents at least one of the received sound and the call arrival sound, the electric signal is input to the plurality of electric-mechanical-acoustic-transducers 22, 32 and 132. When the electric signal represents the audio information for the plurality of channels, an electric signal representing audio information for each of the plurality of channels is input to a respective one of the electric-mechanical-acoustic-transducers 22, 32 and 132

EXAMPLE 5

Figure 13:
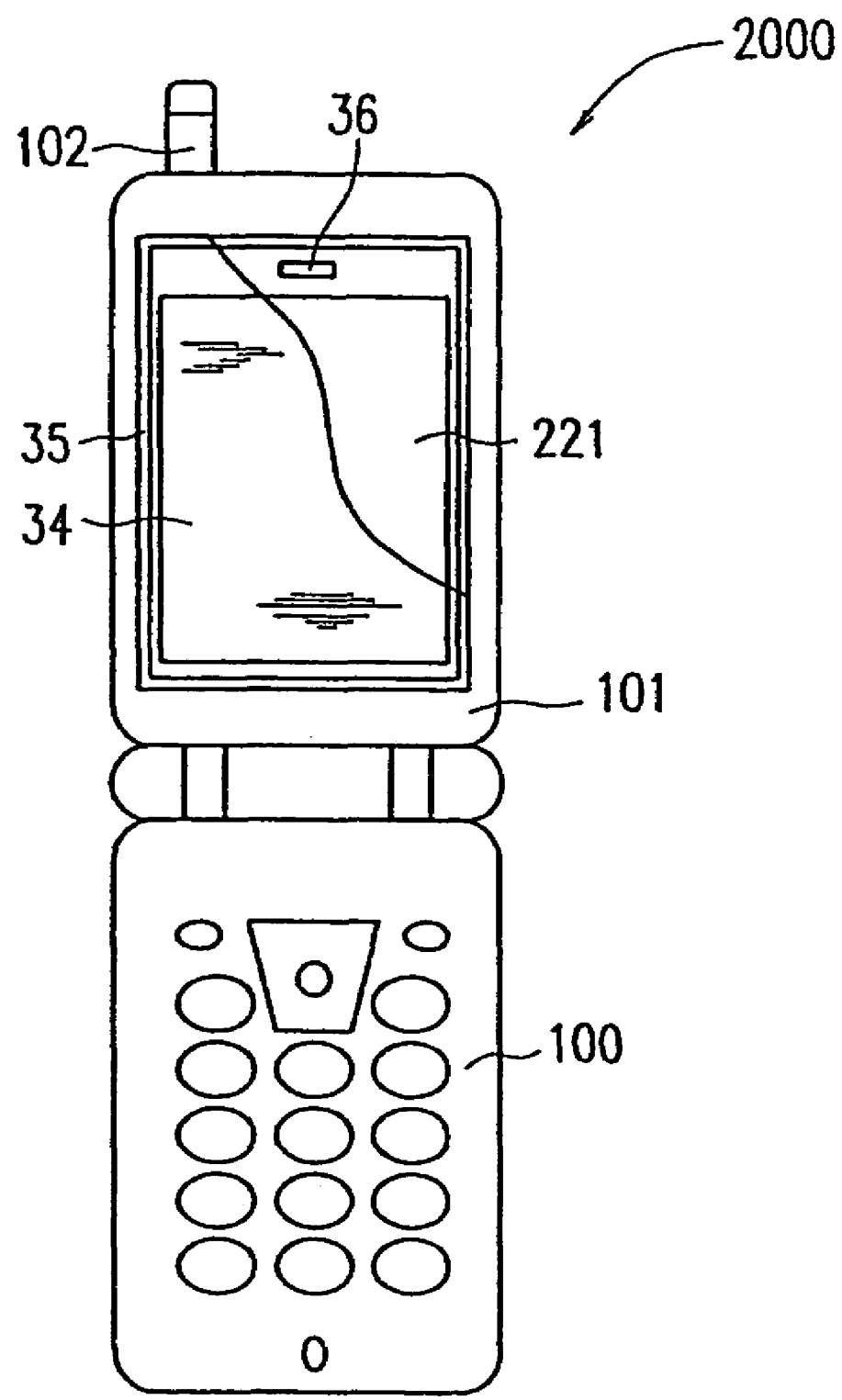
FIG. 13 is a partially out plan view of a mobile terminal device according to a fifth example of the present invention.
Figure 14:
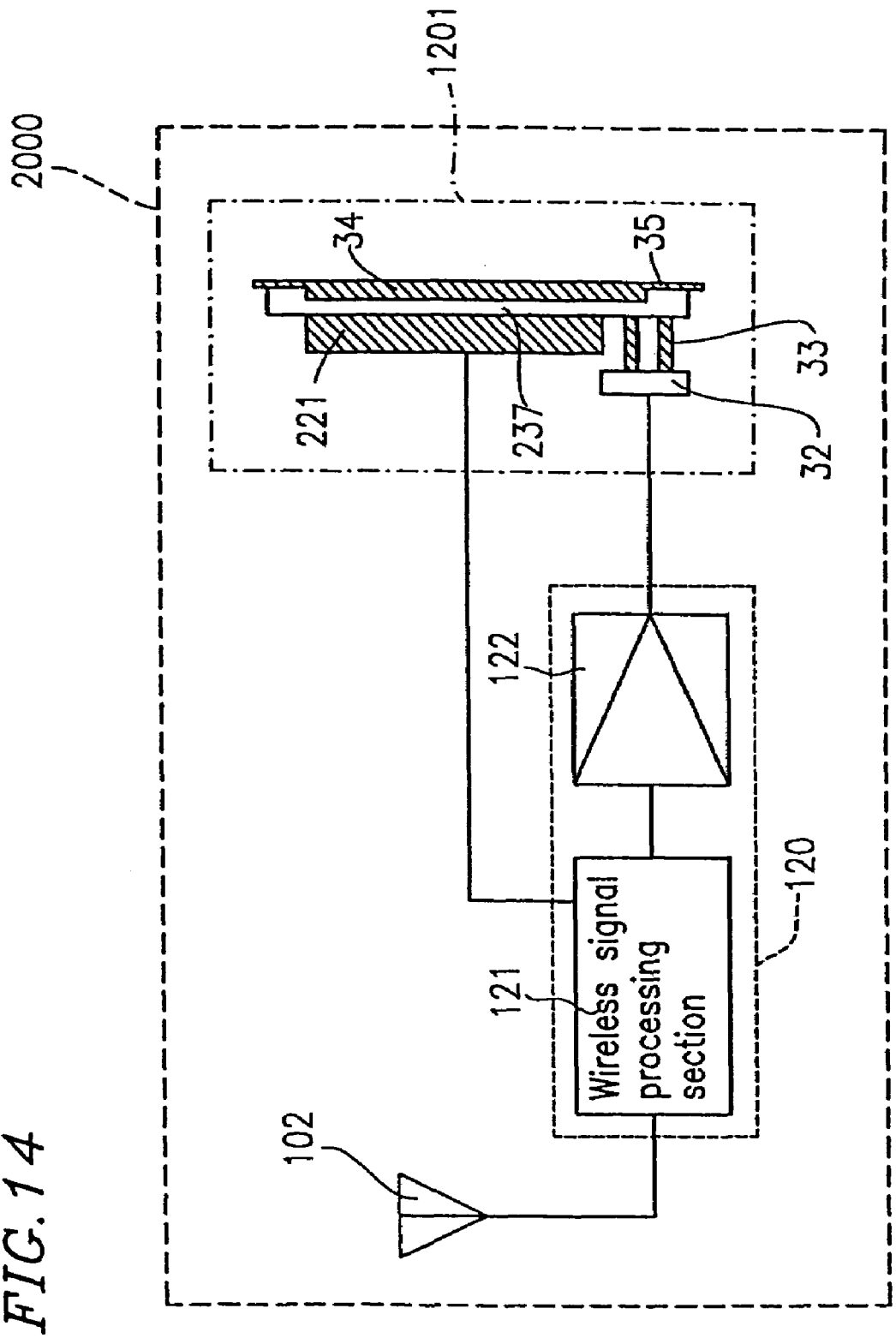
FIG. 14 is a block diagram illustrating an internal structure of the mobile terminal device in the fifth example.

A mobile terminal device 2000 according to a fifth example of the present invention will be described with reference to FIGS. 13 and 14. FIG. 13 is a partially out plan view of the mobile terminal device 2000. FIG. 14 is a block diagram illustrating an internal structure of the mobile terminal device 2000.

In the example, the mobile terminal device 2000 is described as a cellular phone. However, the mobile terminal device 2000 is not limited to a cellular phone. The mobile terminal device 2000 may be, for example, a PDA, a beeper, or a wristwatch.

The Mobile terminal device 2000 includes a first housing 100, a second housing 101 including, for example, a built-in signal receiving circuit, a signal receiving antenna 102 attached to the second housing 101, and a speaker system 1201. The first housing 100 includes an electric circuit, a connector and the like (not shown) built therein. The speaker system 1201 in a modification example of the speaker system 1200 described in the third example The speaker system 1201 includes a display panel 221 instead of the display panel 21 included in the speaker system 1200. The display panel 221 is, for example, a liquid crystal display, and has a function similar to that at the display 21. In the speaker system 1201, the display panel 221 and a peripheral portion 35 of the transparent panel 34 are supported by the second housing 101. The speaker system 1201 includes a space 237 between the display panel 221 and the transparent panel 34. The space 237 is preferably a closed space. The display panel 221 is supported by the second housing 101 such that an image displayed in the display panel 221 can be viewed from outside.

An exemplary operation of the mobile terminal device 2000 will be described.

The operation or the speaker system 1201 is substantially the same as that of the speaker system 1200 described in the third example.

When an electric signal representing a received sound (for example, the voice of a caller) in applied to the electric-mechanical-acoustic-transducer 32 (FIG. 14). the received sound in reproduced from the transparent panel 34. In this case, the speaker system 1201 acts as a receiver, which is a speaker for reproducing the received sound.

When an electric signal representing, for example, a call arrival sound, music, voice or a sound effect for a game is applied to the electric-mechanical-acoustic-transducer 32, the call arrival sound, the music, the voice or the sound effect for the game is reproduced from the transparent panel 34. In this case, the speaker system 1201 acts as a loudspeaker.

In the case where the mobile terminal device 2000 is a telephone having a function of, for example, a video telephone, an image signal is applied to the display panel 221 so as to display the face of a person on the other end in the display panel 221, and concurrently the voice of the person represented by a voice signal is reproduced from the transparent panel 34.

As in the first example, the speaker system 1201 according to the present invention can sufficiently vibrate the transparent panel 34 having a large area and a great weight by a small force. Accordingly, ever when the display panel 221 of the mobile terminal device 2000 has a large area and thus the transparent panel 34 also has a large area, the transparent panel 34 can be sufficiently vibrated. In addition, the surface from which the sound is output is the same as the surface an which the image is displayed. Therefore, the position where the image is displayed to the user can be the same as the position from which the sound is output to the user. Thus, a more realistic acoustic signal reproduction is realized. Such a mobile terminal device 2000 is optimum for simultaneously reproducing the sound and the image.

When the transparent panel 34 operates as a diaphragm of the receiver for reproducing a received sound, the received sound is reproduced from the entire surface of the transparent panel 34. Therefore, at whichever position of the large transparent panel 34 the user's ear may contact, the user can hear the sound. Since it is not necessary to put the user is ear at a particular position, the user's ear is never deviated from the sound source. Such a mobile terminal device 2000 allows especially an aged user to easily hear the received sound.

The operation of the mobile terminal device 2000 will be further descried with reference to FIG. 14.

The mobile terminal device 2000 includes a signal output section 120 for outputting an electric signal based on a wireless signal received by the antenna 102. The signal output section 120 includes a wireless signal processing section 121 and an electric signal amplification section 122.

The antenna 102 receives a wireless signal externally sent (for example, sent from a relay station for cellular phones). The wireless signal represents a call arrival sound, a received sound, music, an image or the like.

When the antenna 102 receives a wireless signal representing a call arrival sound, the wireless signal processing section 121 outputs a call arrival sound signal representing the a arrival sound so as to notify the user of a call arrival. The call arrival sound signal is amplified by the electric signal amplification section 122 and applied to the electric-mechanical-acoustic-transducer 32, and the transparent panel 34 reproduces the call arrival sound. The call arrival sound signal may be a signal representing a present call sound or an audio signal obtained by data distribution or the like. When the user learns of the call arrival and puts the mobile terminal device 2000 into a call receivable state, the wireless signal processing section 121 outputs e receive sound signal representing a received sound (for example, the voice of the caller). The received sound signal is amplified by the electric signal amplification section 122 and applied to the electric-mechanical-acoustic-transducer 32. Thus, the transparent panel 34 reproduces the received sound.

In this case, the user can select one of two methods of using the mobile terminal device 2000; (i) a method of putting his/her ear into contact with the transparent panel 34 as in a general cellular phone; and (ii) a method of using the mobile terminal device 2000 in a hands free mode, from a position away from the mobile terminal device 2000. In the hands free mode, the amplification ratio of the electric signal amplification section 122 is increased so as to raise the reproduction sound volume. Also in the hands free mode, when both of the telephones (telephones of the caller and the user) include a camera so as to provide a function of a video telephone, the caller and the user can talk while seeing each other's face on the display panel 221 based on the image signal. The image signal represents a moving picture, a still picture, character information or other images. When the antenna 102 receives a wireless signal representing an image and the wireless signal output section 121 output an image signal to the display panel 221, the image is displayed in the display panel 221.

In the case where the mobile terminal device 2000 is used in a hands free mode, the speaker system 1201 acts as a loudspeaker. Use of the mobile terminal device 2000 as the loudspeaker realizes, for example, reproduction of a music signal downloaded through the Internet.

The function of the mobile terminal devise 2000 of simultaneously reproducing an image and a sound is effective for, for example, reproducing a promotional video of a music tune or using the mobile terminal device 2000 as a game machine.

The mobile terminal device 2000 may include the speaker system 1000 in the first example instead of the speaker system 1201.

EXAMPLE 6

Figure 15:
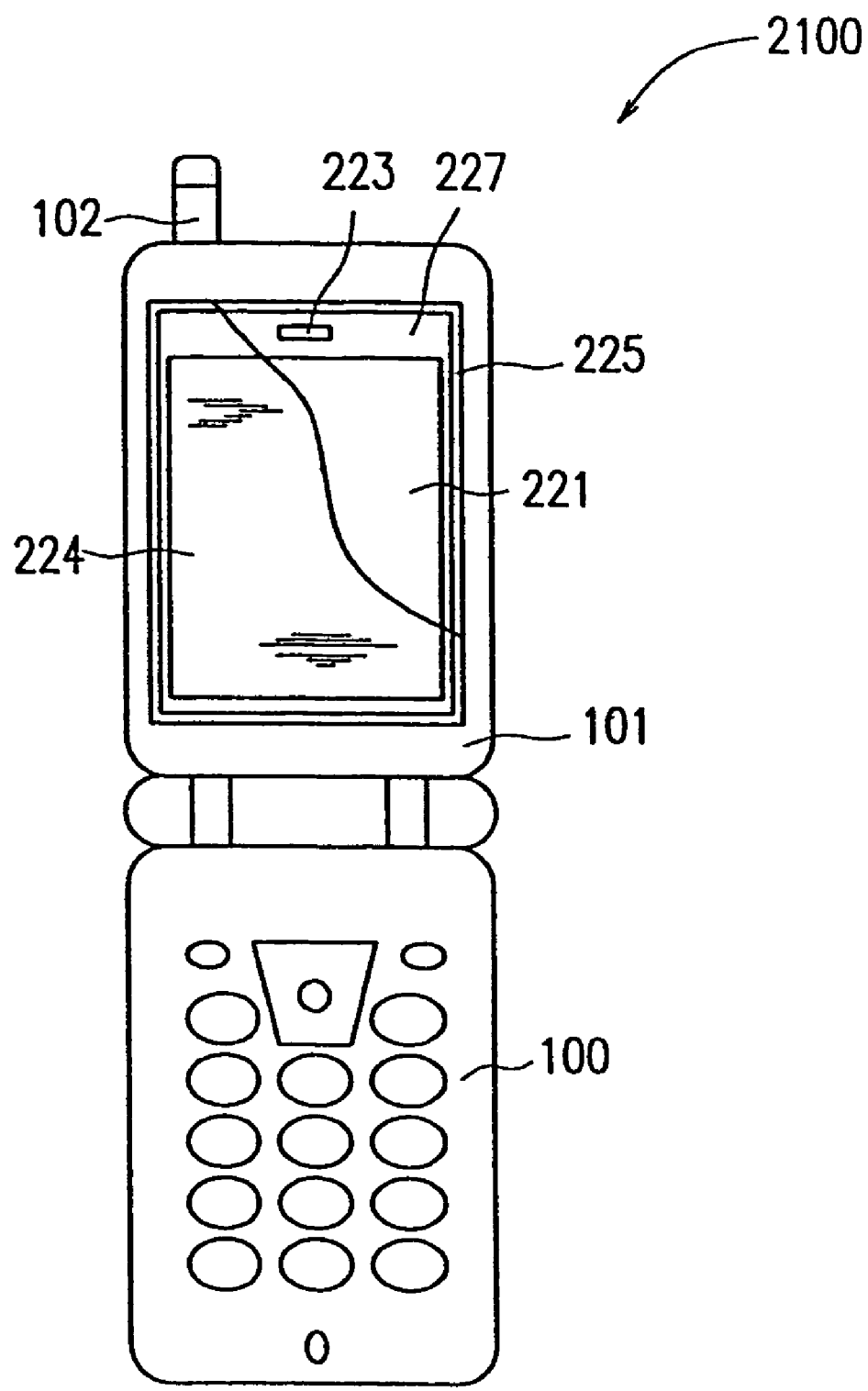
FIG. 15 is a partially cut plan view of a mobile terminal device according to a sixth example of the present invention.
Figure 16:
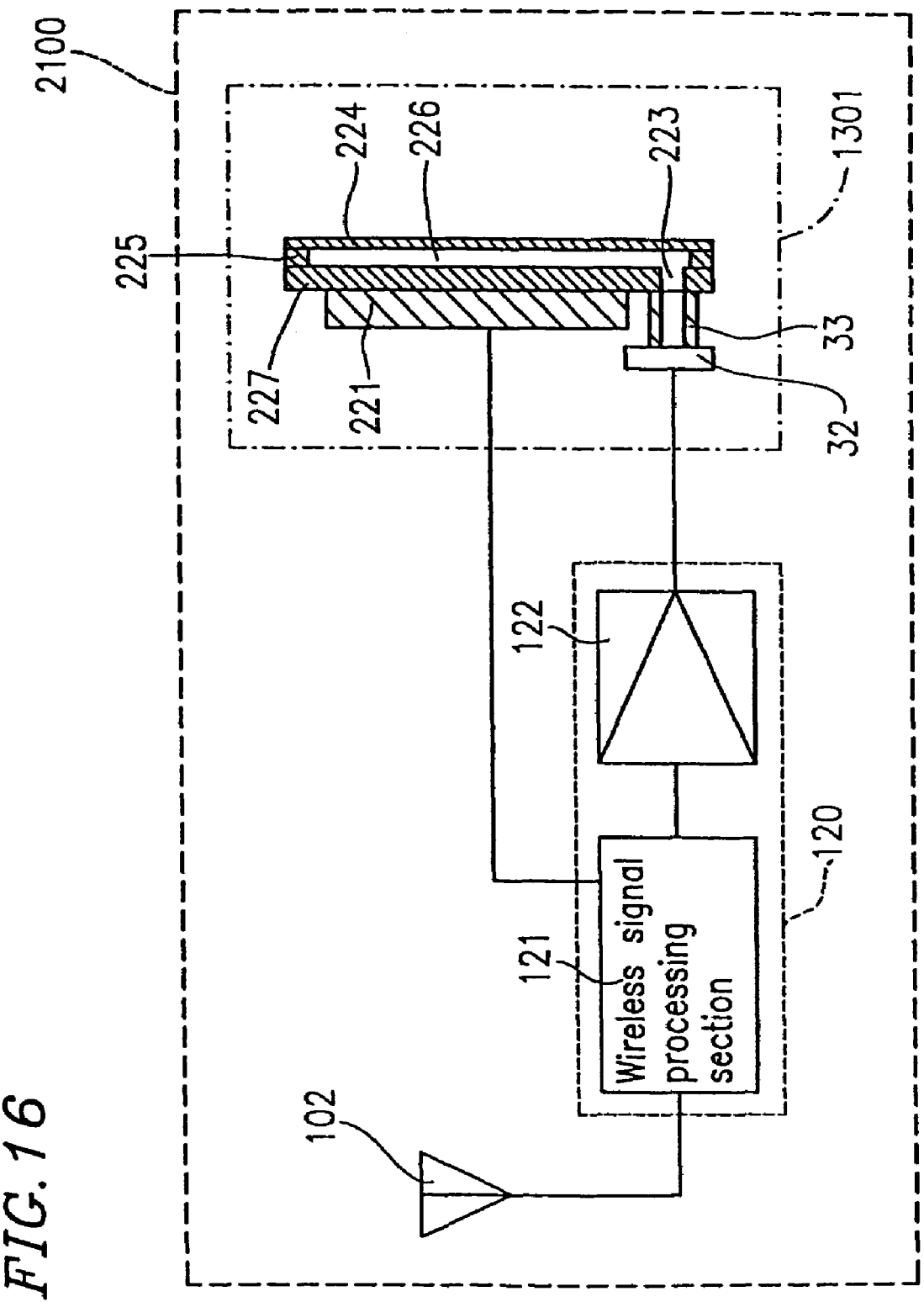
FIG. 16 is a block diagram illustrating an internal structure of the mobile terminal device in the sixth example.

A mobile terminal device 2100 according to a sixth example of the present invention will be described with reference to FIGS. 15 and 16. FIG. 15 is a partially cut plan view of the mobile terminal device 2100. FIG. 16 is a block diagram illustrating an internal structure of the mobile terminal device 2100.

In this example, the mobile terminal device 2100 is described as a cellular phone. However, the mobile terminal device 2000 is not limited to a cellular phone.

The mobile terminal device 2100 includes a first housing 100, a second housing 101 including, for example, a built-in signal receiving circuit, a signal receiving antenna 102 attached to the second housing 101, and a speaker system 1301. The first housing 100 includes an electric circuit, a connector and the like (not shown) built therein. The speaker system 1301 in modification example of the speaker system 1300 described in the third example. The speaker system 1301 includes a display panel 221 instead of the display panel 211 included in the speaker system 1300. In the speaker system 1301, the display panel 221 is supported by the second housing 101 such that an image displayed in the display panel 221 can be viewed from outside.

An exemplary operation of the mobile terminal device 2100 will be described. The mobile terminal device 2100 is different from the mobile terminal device 2000 in that the mobile terminal device 2100 includes the speaker system 1301 instead of the speaker system 1201 included in the mobile terminal device 2000. The structure of the mobile terminal device 2100 is substantially the same as that of the mobile terminal device 2000 except for the speaker system, and operates in substantially the sane manner as the mobile terminal device 2000. The speaker system 1301 includes the substrate 227. The substrate 227 provides the effect as described in the third example. The operation of the speaker system 1301 is substantially the same as that of the speaker system 1300 described in the third example.

When an electric signal representing a received sound is applied to the electric-mechanical-acoustic-transducer 32 (FIG. 16). the received sound is reproduced from the transparent panel 224. In this case, the speaker system 1301 acts as a receiver, which is a speaker for reproducing the received sound.

When an electric signal representing, for example, a call arrival sound, music, voice or a sound effect for a game is applied to the electric-mechanical-acoustic-transducer 32, the call arrival sound, the music, the voice or the sound effect for the game is reproduced from the transparent panel 224. In this case, the speaker system 1301 acts as a loudspeaker.

In the case where the mobile terminal device 2100 it a telephone having a function of, for example, a video telephone, an image signal is applied to the display panel 221 so as to display the face of a person on the other end in the display panel 221, and concurrently the voice of the person represented by a voice signal is reproduced from the transparent panel 224.

The operation of the mobile terminal device 2100 will be further described with reference to FIG. 16.

The mobile terminal device 2100 includes a signal output section 120 for outputting an electric signal based on a wireless signal received by the antenna 102. The signal output section 120 includes a wireless signal processing section 121 and an electric signal amplification section 122. The operation of the mobile terminal device 2100 of receiving a wireless signal and driving the speaker system 1301 is substantially the same as that of the mobile terminal device 2000.

The mobile terminal device 2100 may include the speaker system 1000 in the first example instead of the speaker system 1301.

In this example, the mobile terminal device including at speaker system according to the present invention la described. A speaker system according to the present invention is applicable to an electronic device having a display panel, for example, a TV, a personal computer, a game machine, or a car navigation system.

EXAMPLE 7

Figure 17:
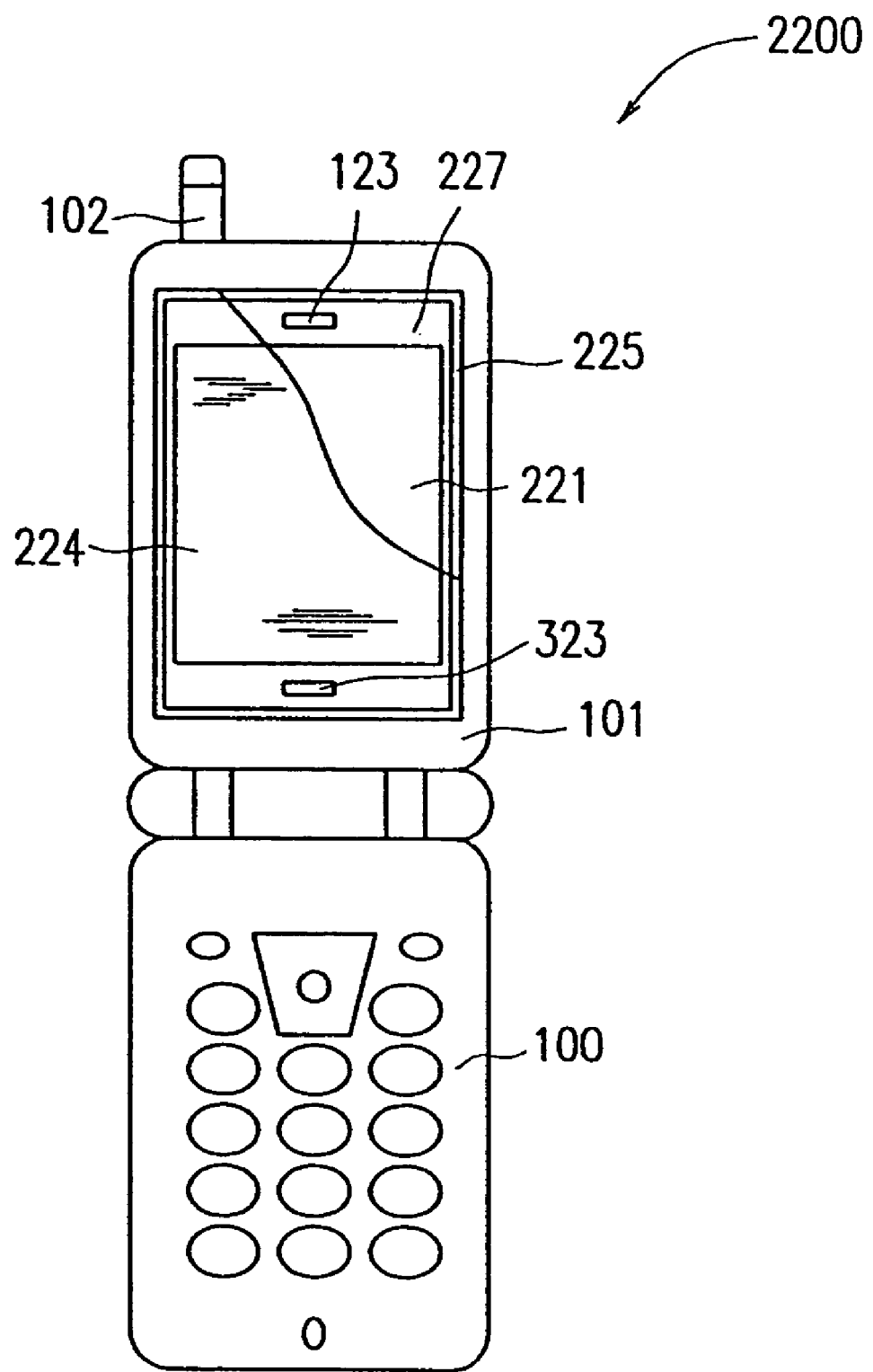
FIG. 17 is a partially cut plan view of a mobile terminal device according to a seventh example of the present invention.
Figure 18:
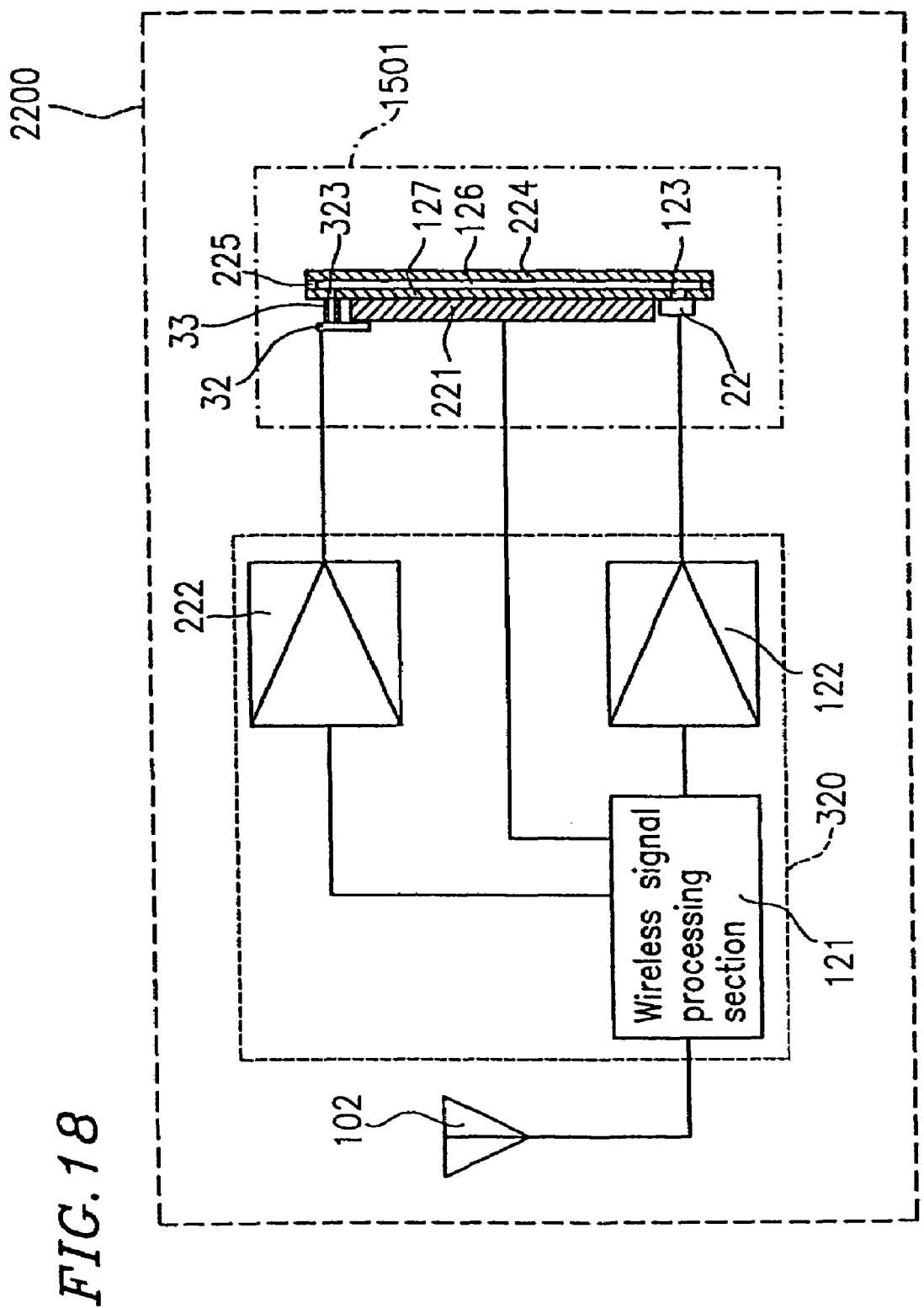
FIG. 18 is a block diagram illustrating an internal structure of the mobile terminal device in the seventh example.

A mobile terminal device 2200 according to a seventh example of the present invention will be described with reference to FIGS. 17 and 18. FIG. 17 is a partially cut plan view of the mobile terminal device 2200. FIG. 18 is a block diagram illustrating an internal structure of the mobile terminal device 2200.

In this example, the mobile terminal device 2200 is described an a cellular phone. However, the mobile terminal device 2200 is not limited to a cellular phone.

The mobile terminal device 2200 includes a first housing 100, a second housing 101 including, for example, a built-in signal receiving circuit, a signal receiving antenna 102 attached to the second housing 101, and a speaker system 1501. The first housing 100 includes an electric circuit, a connector and the like (not shown) built therein. The speaker system 1501 is a modification example of the speaker system 1500 described in the fourth example. The speaker system 1501 includes a display panel 221 instead of the display panel 21 included in the speaker system 1500. In the speaker system 1501, the display panel 221 and the substrate 227 are supported by the second housing 101. The display panel 221 is supported by the second housing 101 such that an image displayed in the display panel 221 can be viewed from outside.

An exemplary operation of the mobile terminal device 2200 will be described.

The operation or the speaker system 1501 is substantially the same as that of the speaker system 1500 described in the fourth example.

When an electric signal representing a received sound is applied to at least one of the electric-mechanical-acoustic-transducers 22 and 32 (FIG. 18), the received sound is reproduced from the transparent panel 224. In this case, the speaker system 1501 acts as a receiver, which is a speaker for reproducing the received sound.

When an electric signal representing, for example, a call arrival sound, music, voice or a sound effect for a game is applied to at least one of the electric-mechanical-acoustic-transducers 22 and 32, the call arrival sound, the music, the voice or the sound effect for the game is reproduced from the transparent panel 224. In this case, the speaker system 1501 acts as a loudspeaker.

When the same electric signal is applied to the electric-mechanical-acoustic-transducers 22 and 32, the sound pressure level can be improved au compared to the sound pressure level obtained by a speaker system including one electric-mechanical-acoustic-transducer, with a given power consumption. Of described above, the speaker system 1501 can reproduce audio signals for a plurality of channels. For, for example, reproducing audio signals representing music in stereo, a music signal for the right channel is applied to the electric-mechanical-acoustic-transducer 22 applied a music signal for the left channel is applied to the electric-mechanical-acoustic-transducer 32. Thus, the music is reproduced in stereo from the transparent panel 224.

In the case where the mobile terminal device 2200 is a telephone having a function of, for example, a video telephone, an image signal is applied to the display panel 221 so as to display the face of a person on the other end in the display panel 221, and concurrently the voice of the person represented by a voice signal is reproduced from the transparent panel 224.

As in the first example, the speaker system 1501 according to the present invention can sufficiently vibrate the transparent panel 224 having a large area and a great weight by a small force. Accordingly, even when the display panel 221 of the mobile terminal device 2200 has a large area and thus the transparent panel 224 also has a large area, the transparent panel 224 can be sufficiently vibrated. In addition, the surface from which the sound is output is the same as the surface on which the image is displayed. Therefore, the position where the image is displayed to the user can be the same an the position from which the sound is output to the user. Thus, a more realistic acoustic signal reproduction is realized.

The operation of the mobile terminal device 2200 will be further described with reference to FIG. 18.

The mobile terminal device 2200 includes a signal output section 320 for outputting un electric signal based on a wireless signal received by the antenna 102. The signal output section 320 includes a wireless signal processing section 121 and electric signal amplification sections 122 and 222.

The antenna 102 receives a wireless signal externally sent (for example, sent from a relay station for cellular phones). The wireless signal represents a call arrival sound, a received sound, music, an image or the like.

When the antenna 102 receives a wireless signal representing a call arrival sound, the wireless signal processing section 121 outputs a call arrival sound signal representing the call arrival sound so as to notify the user of a call arrival. The call arrival sound signal is amplified by at least one or the electric signal amplification sections 122 and 222 and applied to at least one of the electric-mechanical-acoustic-transducers 22 and 32, and the transparent panel 224 reproduces the call arrival sound. The call arrival sound signal may be a signal representing a preset call mound or an audio signal obtained by data distribution or the like. When the call arrival sound signal is input in the form of stereo audio signals, the audio signal for the right channel is amplified by the electric signal amplification section 122 and applied to the electric-mechanical-acoustic-transducer 22, and the audio signal for the left channel in amplified by the electric signal amplification section 222 and applied to the electric-mechanical-acoustic-transducer 32. Thus, the transparent panel 34 reproduces a stereo sound. When the user learns or the call arrival and puts the mobile terminal device 2200 into a call receivable state, the wireless signal processing section 121 outputs a received sound signal representing a received sound (for example, the voice of the caller). The received sound signal is amplified by at least one of the electric signal amplification sections 122 and 222 and applied to at least one of the electric-mechanical-acoustic-transducers 22 and 32. Thus, the transparent panel 224 reproduces the received sound.

In this case, the user can select one of two methods of using the mobile terminal device 2200: (i) a method of putting his/her ear into contact with the transparent panel 224 an in a general cellular phone; and (ii) a method of using the mobile terminal device 2200 in a hands free mode, from a position away from the mobile terminal device 2200. In the hands free mode, the amplification ratio of the electric signal amplification sections 122 and 222 is increased no as to raise the reproduction sound volume. Also in the hands free mode, when both of the telephones (telephones of the caller and the user) include a camera so as to provide a function of a video telephone, the caller and the user can talk while seeing each other's face on the display panel 221 based on the image signal. The image signal represents a moving picture, a still picture, character information or other images. When the antenna 102 receives a wireless signal representing an image and the signal output section 320 outputs an image signal to the display panel 221, the image is displayed in the display panel 221.

In the case where the mobile terminal device 2200 is used in a hands free mode, the speaker system 1501 acts as a loudspeaker. Use of the mobile terminal device 2200 as the loudspeaker realizes for examples reproduction of a music signal downloaded through the Internet.

The function of the mobile terminal device 2200 of simultaneously reproducing an image and a sound in effective for, for example, reproducing promotional video of a music tune or using the mobile terminal device 2200 as a game machine.

In the mobile terminal device 2200, the electric signal represents at least one of a received sound, a call arrival sound, and audio information for a plurality of channels. When the electric signal represents at least one of the received sound and the call arrival sound, the electric signal is input to the plurality of electric-mechanical-acoustic-transducers 22 and 32. When the electric signal represents the audio information for the plurality of channels, an electric signal representing audio information for each of the plurality of channels is input to a respective one of the electric-mechanical-acoustic-transducers 22 and 32.

The mobile terminal device 2200 may include the speaker system 1400 in the fourth example instead of the speaker system 1501. In this case, the operation of the speaker system 1400 is substantially the some as that of the speaker system 1501.

In this example, the mobile terminal device including a speaker system according to the present invention is described. A speaker system according to the present invention is applicable to an electronic device having a display panel, for example, a TV, a personal computer, a game machine, or a oar navigation system.

EXAMPLE 8

Figure 19A:
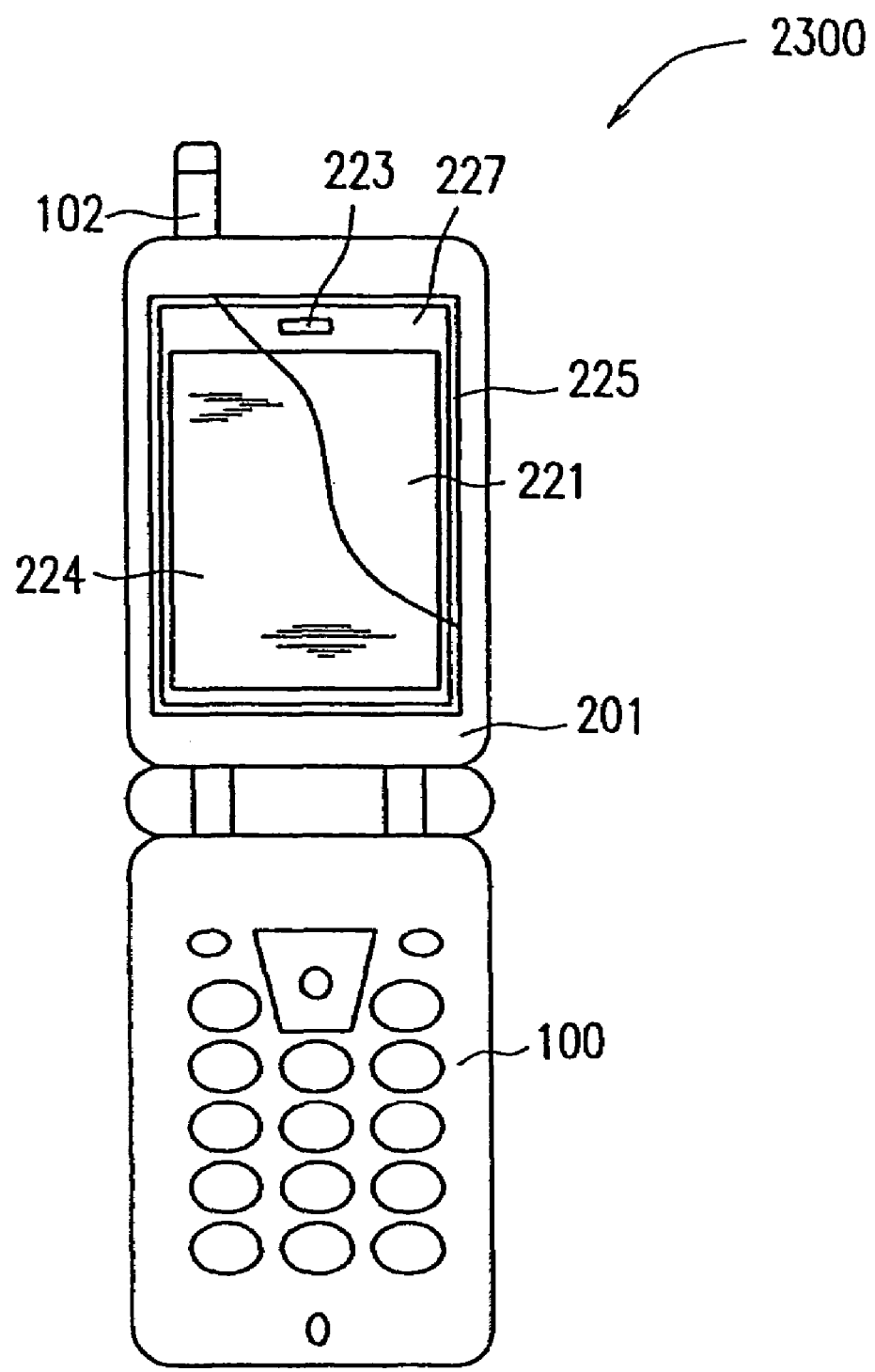
FIG. 19A is a partially cut plan view of a mobile terminal device according to an eighth example of the present invention.
Figure 19B:
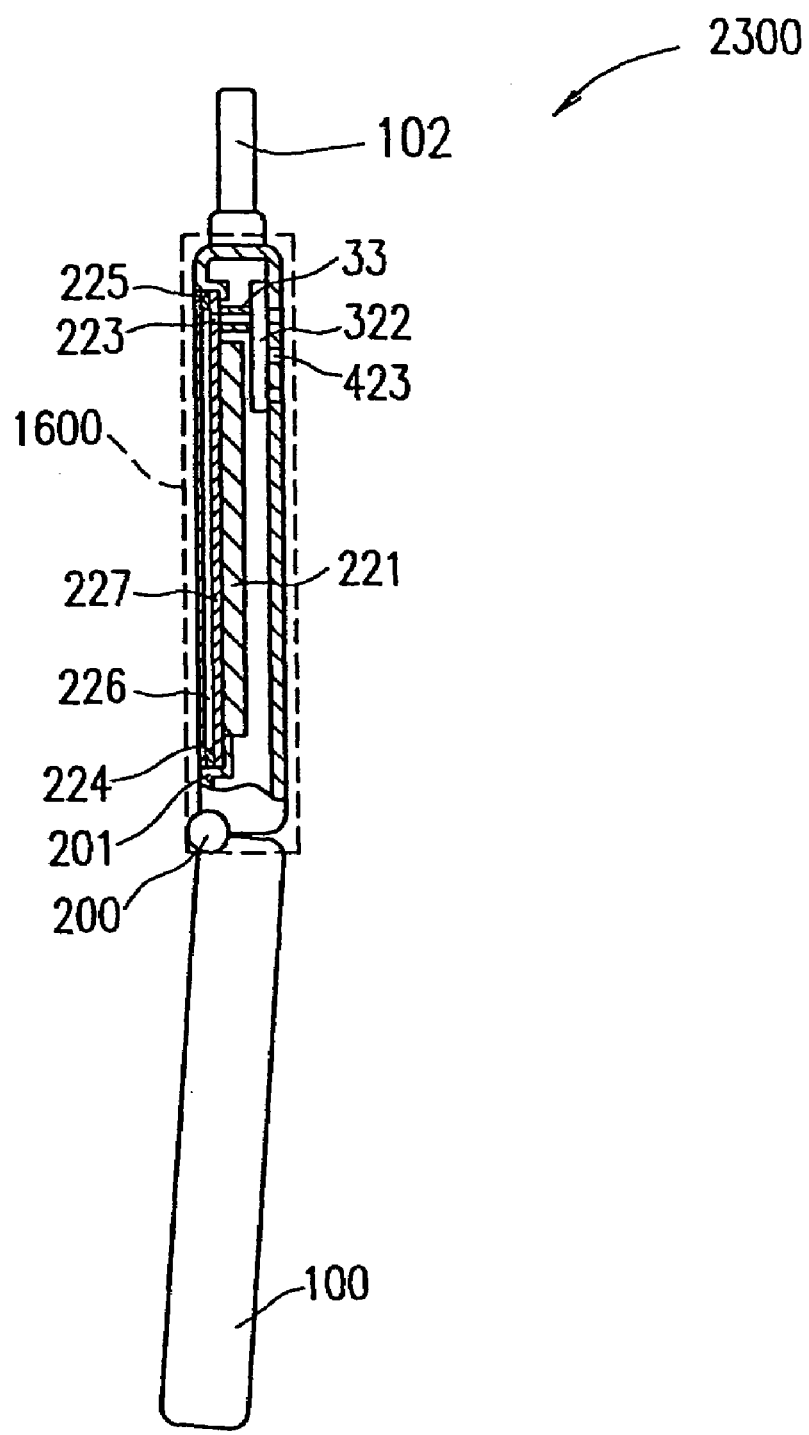
FIG. 19B is a partially cut side view of the mobile terminal device according to the eighth example.
Figure 19C:
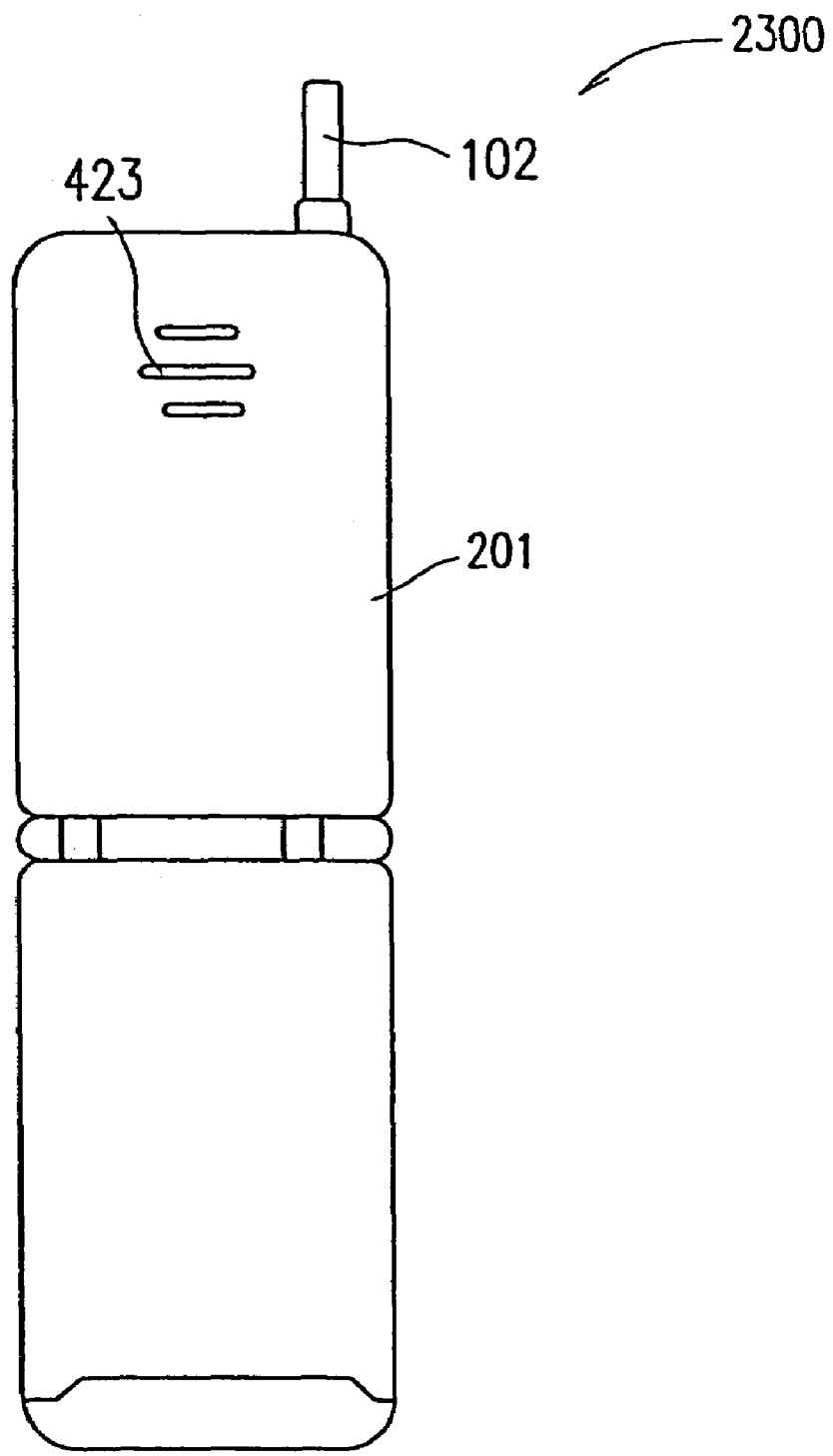
FIG. 19C in a bottom view of the mobile terminal device according to the eighth example.

A mobile terminal device 2300 according to an eighth example of the present invention will be described with reference to FIGS. 19A, 19B, 19C and 20. FIG. 19A is a partially out plan view of the mobile terminal device 2300 FIG. 19B is a partially cut side view of the mobile terminal device 2300. FIG. 19C is a bottom view of the mobile terminal device 2300.

In this example, the mobile terminal device 2300 is described as a cellular phone. However, the mobile terminal device 2300 is not limited to a cellular phone.

The mobile terminal device 2300 includes a first housing 100, a second housing 201, a signal receiving antenna 102 attached to the second housing 201, and a speaker system 1600. The speaker system 1600 is a modification example of the speaker system 1300 described in the third example. The speaker system 1600 includes an electric-mechanical-acoustic-transducer 322 instead of the electric-mechanical-acoustic-transducer 32. In the speaker system 1600, the display panel 221 and the substrate 227 arc supported by the second housing 201. The second housing 201 has a sound hole 423. The second housing 201 includes an electric circuit, a connector and the like (not shown) built therein.

Figure 20:
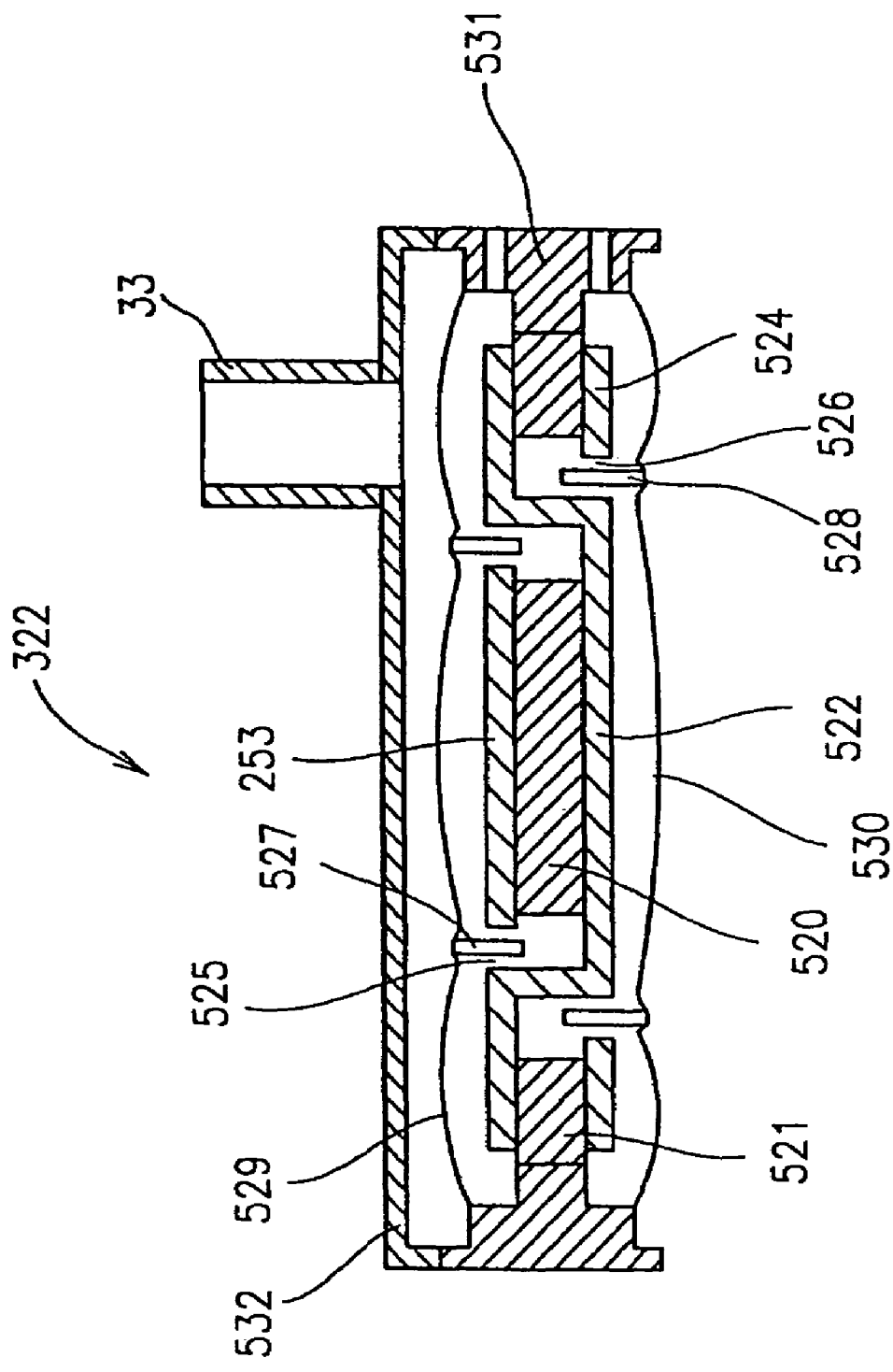
FIG. 20 is a cross-sectional view of an electric-mechanical-acoustic-transducer included in the mobile terminal device according to the eighth example.

With reference to FIG. 20, the electric-mechanical-acoustic-transducer 322 will be described. The electric-mechanical-acoustic-transducer 322 includes a cylindrical first magnet 520, an annular second magnet 521 provided so as to surround the first magnet 520, a yoke 522 for connecting the first magnet 520 and the second magnet 521, a first voice coil 527 provided in a first magnetic gap 525 between the first magnet 520 and the yoke 522, a second voice coil 528 provided in a second magnetic gap 526 between the second magnet 521 and the yoke 522, a first diaphragm 529 connected to the first voice coil 527, a second diaphragm 530 provided oppositely to the diaphragm 529 with respect to the first magnet 520 and connected to the second voice coil 528, a disc-shaped first magnetic plate 523 provided between the first diaphragm 529 and the first magnet 520, an annular second magnetic plate 524 provided between the second diaphragm 530 and the second magnet 521, a first housing 531 for supporting the first diaphragm 529, the second diaphragm 530 and the second magnet 521, and a second housing 532 for covering the first diaphragm 529 provided oppositely to the diaphragm 529 with respect to the first magnet 520. The second housing 532 is connected to the acoustic pipe 33.

An exemplary operation of the electric-mechanical-acoustic-transducer 322 will be described.

When an electric signal is applied to the first voice coil 527 inserted into the first magnetic gap 525, a driving force is generated in the first voice coil 527. Then, the first diaphragm 529 connected to the first voice coil 527 is vibrated so as to generate a sound. Similarly, when an electric signal is applied to the second voice coil 528 inserted into the second magnetic gap 626, a driving force is generated in the second voice coil 528. Then, the second diaphragm 530 connected to the second voice coil 520 is vibrated so as to generate a sound.

The sound output from the first diaphragm 529 is transferred to the space 226 via the acoustic pipe 33, and thus the sound is output from the transparent panel 224. The sound output from the second diaphragm 530 in transferred outside the mobile terminal device 2300 via the sound hole 423 (FIG. 19B).

In the electric-mechanical-acoustic-transducer 322, the first voice coil 527 inserted into the first magnetic gap 525 in driven using the first magnet 520, and the second voice call 528 inserted into the second magnetic gap 526 is driven using the second magnet 521. Since the first and second magnets 527 and 528 are driven by different magnets, the driving force generated in each of the first and sound voice coil 527 and 528 can be increased. Thus, the electric-mechanical-acoustic-transducer 322 can generate a sound having a large volume.

The first voice coil 527 and the second voice coil 528 are independently drivable from each other. A call arrival sound or a received sound which is output from the first diaphragm 529 is transferred to the space 226 via the acoustic pipe 33. Thus, the call arrival sound or the received sound is output from the transparent panel 224. The housing 100 and the second housing 101 can be folded with respect to each other along a connection section 200. When the mobile terminal device 2300 is open (i.e., when the housing 100 and the second housing 101 are not folded with respect to each other), the user can clearly hear the call arrival around output from the transparent panel 224. By contrast, when the mobile terminal device 2300 is closed (i.e., When the housing 100 and the second housing 101 are folded with respect to each other), the call arrival sound output from the transparent panel 224 is shielded by the first housing 100, making it difficult for the user to hear the call arrival wound. In order to avoid this, the call arrival sound is output from the second diaphragm 530 when the mobile terminal device 2300 is closed. Thus, the user cam clearly hear the call arrival sound. In a conventional foldable mobile terminal device, it is desired that two electric-mechanical-acoustic-transducers are provided: one for both outputting a sound outside in a closed state, and the other for realizing a dialog in an open state. This enlarges the space required for the electric-mechanical-acoustic-transducers. In the mobile terminal device 2300 according to the present invention, one electric-mechanical-acoustic-transducer is usable both for outputting a sound outride in a closed state and realizing a dialog in an open state. This reduces the space for the electric-mechanical-acoustic-transducer.

The speaker system 1200 in the third example including the electric-mechanical-acoustic-transducer 322 instead of the electric-mechanical-acoustic-transducer 32 may be used instead of the speaker system 1600.

EXAMPLE 9

Figure 21A:
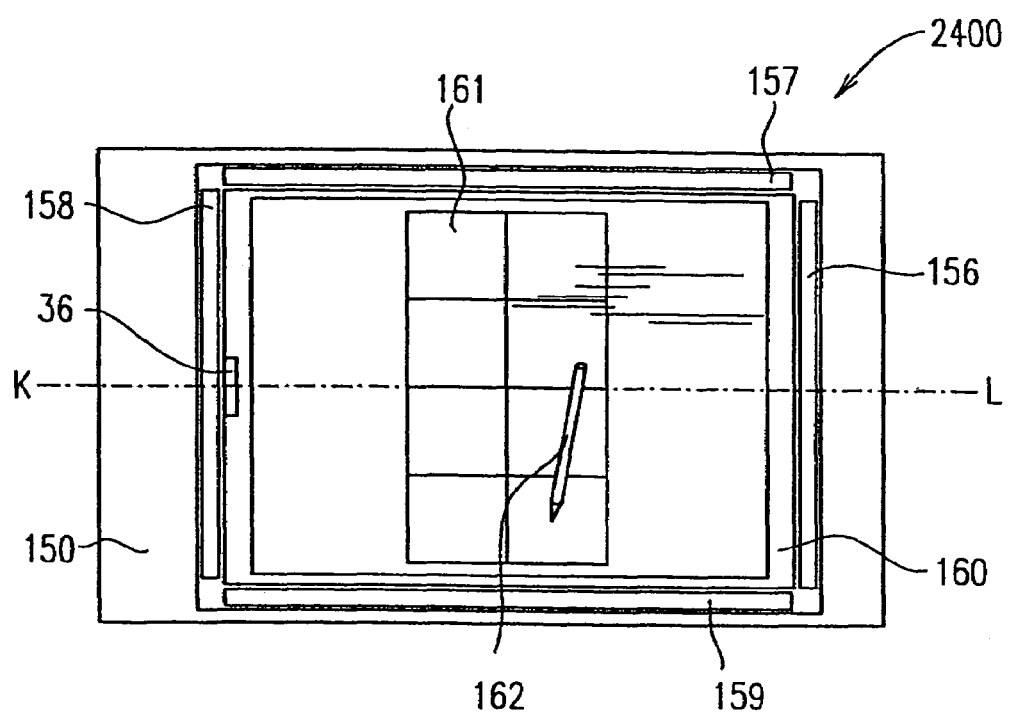
FIG. 21A is a plan view of an electronic device according to a ninth example of the present invention.
Figure 21B:
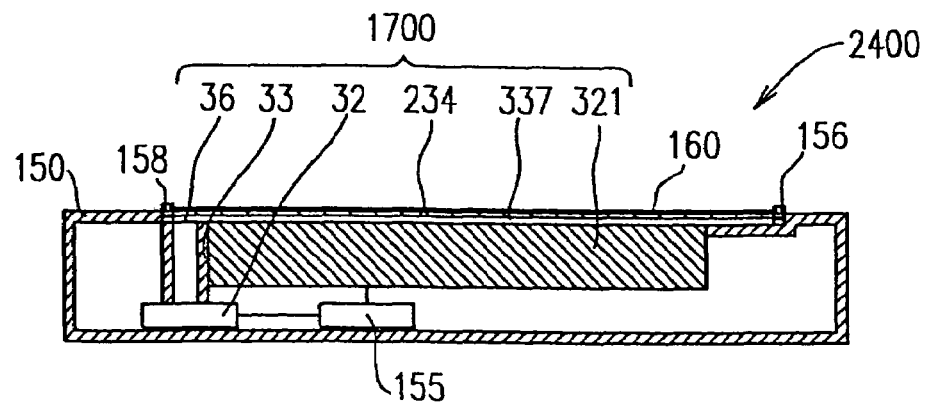
FIG. 21B is a cross-sectional view of the electronic device taken along chain line K-L shown in FIG. 21A.

An electronic device 2400 according to a ninth example of the present invention Will be described with reference to FIGS. 21A and 21B. FIG. 21A is a plan view of the electronic device 2400. FIG. 21B is a cross-sectional view of the electronic device 2400 taken along chain line K-L shown in FIG. 21A.

In this example, the electronic device 2400 is described an a PDA. However, the electronic device 2400 is not limited to A PDA.

The electronic device 2400 includes a housing 150 and a speaker system 1700. The speaker system 1700 is a modification example of the speaker system 1200 described in the third example (FIGS. 7A and 7B). The speaker system 1700 includes a display panel 321 and a transparent panel 234 instead of the display panel 21 and the transparent panel 34.

The display panel 321 has substantially the same function as that or the display panel 21. The transparent panel 234 as a film formed of PET, acrylic resins or other transparent resins. The electronic device 2400 includes a space 337 between the display panel 321 and the transparent panel 234. The space 337 is preferably a closed space. In the speaker system 1700, the display panel 321 and transparent panel 234 are supported by the housing 150. The display panel 321 is supported such that an image displayed in the display panel 321 can be viewed from outside.

A surface of the transparent panel 234 is coated with a conductive film 160 such that the resistivity of the surface of the transparent panel 234 is uniform. The transparent panel 234 acts as a transparent conductor. Electrodes 156, 157, 158 and 159 are provided along the four sides of the surface of the transparent panel 234. The electronic device 2400 also includes a control section 155 for processing an image signal and an acoustic signal. The display panel 321 is driven by the control section 155 so as to drive operation menu icons 161 or the like. The control section 155 applies a voltage to the electrodes 156, 157, 158 and 159. The transparent panel 234 acts as a touch panel.

An exemplary operation of the electronic device 2400 will be described. The speaker system 1700 operates in substantially the same manner as the speaker system 1200.

The user puts an icon click-dedicated input pen 162 or the user's ringer as a contact member into contact with a position of the transparent panel 234 corresponding to one of the operation menu icons 161 and applies a pressure to the position. When the icon click-dedicated input pen 162 or the user's finger contacts the transparent panel 234, a current flows from the electrodes 156, 157, 158 and 159 to the icon click-dedicated input pen 162 owing to the static capacitance of the icon click-dedicated input pen 162 or the user's finger. By the flow of the current through the electrodes 156, 157, 158 and 159, the contact of the icon click-dedicated input pen 162 to the transparent panel 234 is detected. Based on the value of the current flowing through each of the electrodes 156, 157, 158 and 159, the control section 155 calculates the coordinate value of the position of the transparent panel 234 which is in contact with the icon click-dedicated input pen 162 or the user's finger. In accordance with the content of the operation menu icon 161 corresponding to the detected coordinate value, the control section 155 causes the electronic device 2400 to perform a prescribed function (for example, sending or receiving of an electronic mail).

An operation of a general touch panel is disclosed by Japanese Laid-Open Publication. No. 9-265341. According to the present invention, the transparent panel 234 acts as a static capacitance system touch panel. Namely, the transparent panel 234 is used both as a touch panel and a transparent panel for acoustic signal reproduction. The electronic device including the touch panel has a space between the display panel and the touch panel. The sound output from the electric-mechanical-acoustic-transducer is transferred to the space, and thus the sound is output from the touch panel.

An electronic device, including a panel which is usable both as the touch panel and the transparent panel for acoustic signal reproduction, reproduces a sound from the touch panel The component for acoustic signal reproduction can be amplified. In such an electronic device, a speaker system according to the present invention can be easily produced. The touch panel is transparent and transmissive with respect to visible light. Therefore, the touch panel does not shield an image displayed in the display panel.

In this example, the transparent panel 234 is also used as a static capacitance system touch panel. Alternatively, the transparent panel 234 may also be used as an optical system touch panel. The optical system touch panel includes a plurality of light emitting elements and a plurality of light receiving elements. The optical system touch panel detects that the light emitted by one of light emitting elements is shielded before reaching the corresponding light receiving element, and thug detects the position of the transparent panel 234 which is in contact with the contact member. Still alternatively, the transparent panel 234 may be, for example, an electromagnetic induction type system panel or an ultrasonic system touch panel. The electromagnetic induction system touch panel uses a loop antenna to detect the position of the transparent panel 234 which is in contact with a contact member including a resonating circuit. The ultrasonic system touch panel uses a vibration sensor to detect the position of the transparent panel 234 which is in contact with a contact member including an ultrasonic diaphragm. Regardless of the system, substantially the same effect in provided. In any of these systems, one panel can be used both as a touch panel and a vibration panel. The method for detecting the position in the transparent panel 234 using the touch panel is not limited to the above.

The speaker system 1300 described in the third example may be used in the speaker system 1700.

EXAMPLE 10

Figure 22A:
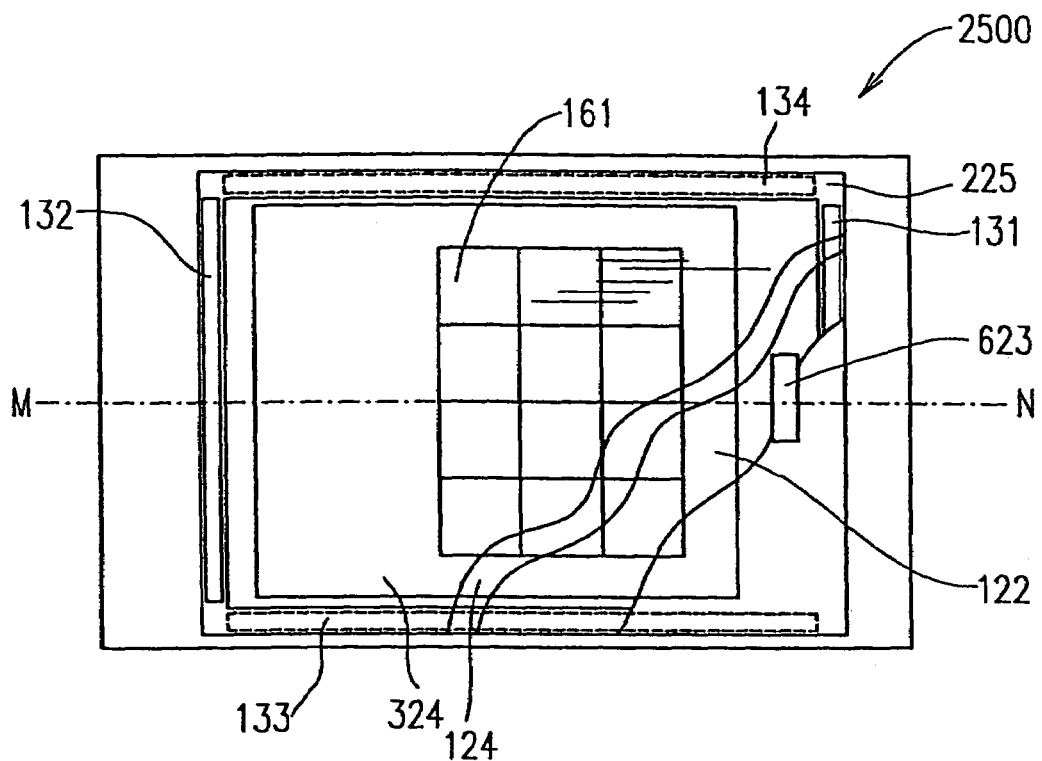
FIG. 22A is a plan view of an electronic device according to a tenth example of the present invention.
Figure 22B:
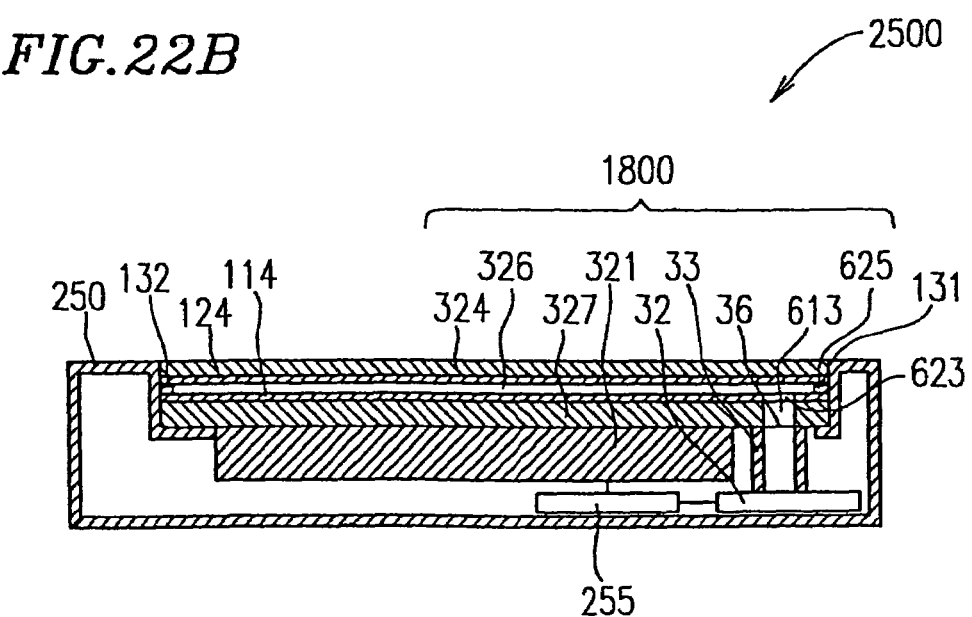
FIG. 22B is a cross-sectional view of the electronic device taken along chain line M-N shown in FIG. 22A.

An electronic device 2500 according to a tenth example of the present invention will be described with reference to FIGS. 22A and 22B. FIG. 22A is a plan view of the electronic device 2500. FIG. 22B is a cross-sectional view of the electronic device 2500 taken along chain line M-N shown in FIG. 22A.

In this example, the electronic device 2500 is described as a PDA. However, the electronic device 2500 is not limited to a PDA, but may be an installation type electronic device.

The electronic device 2500 includes a housing 250 and a speaker system 1800. The speaker system 1800 is a modification example of the speaker system 1300 described in the third example (FIGS. 9A and 9B). The speaker system 1800. Includes a display panel 321, a transparent panel 374 and a substrate 327 instead of the display panel 21, the transparent panel 224 and the substrate 227. The display panel 324 is a film formed of PET, acrylic resins or other transparent resins. The substrate 327 is formed of a transparent material formed of, for example, polycarbonate. In the speaker system 1800, the display panel 321 and the substrate 327 are supported by the housing 250. The display panel 321 is supported by the housing 250 such that an image displayed in the display panel 321 can be viewed from outside. The substrate 327 has a sound hole 613, which is communicated to the opening 36 of the acoustic pipe (not shown in FIGS. 22A or 22B).

A transparent electrode 114 having an electric resistance is provided on a top surface of the substrate 327. A transparent electrode 124 having an electric resistance is provided on a bottom surface of the transparent panel 324. On a top surface of two shorter sides of the spacer 625, electrodes 131 and 132 are provided for detecting an electric resistance. The electrodes 131 and 132 are in contact with the transparent electrode 124. On a bottom surface of two longer sides of the spacer 625, electrodes 133 and 134 are provided for detecting an electric resistance. The electrodes 133 and 134 are in contact with the transparent electrode 114. The electronic device 2500 includes a space 326 between the transparent electrode 114 provided on the substrate 327 and the transparent electrode 124 provided on the transparent panel 324. The transparent panel 324 and the substrate 327 are connected to each other via a spacer 625. The space 326 is preferably a closed space. The electronic device 2500 further includes a control section 255 for processing an image signal and an acoustic signal. The display panel 321 is driven by the control section 255 and displays, for example, operation menu icons 161. The control section 255 applies a voltage to the electrodes 131, 132, 133 and 134. The transparent panel 324 and the substrate 327 act as a touch panel. The transparent electrode 114 has a rectangular sound hole 623.

An exemplary operation of the electronic device 2500 will be described. The speaker system 1800 operates in substantially the game manner as the speaker system 1300 described in the third example.

The control section 155 applies a voltage to the electrodes 156, 157, 158 and 139. The user puts the icon click-dedicated input pen 162 (FIG. 21A) or the user's finger as a contact member into contact with a position of the transparent panel 324 corresponding to one of the operation menu icons 161 displayed in the display panel 321 and applies a pressure to the position. The application of the pressure causes the transparent electrode 114 and the transparent electrode 124 into contact with each other. Thus, an electric current flows to each of the electrodes 131, 132, 133 and 134, and the contact of the icon click-dedicated input pen 162 to the transparent panel 324 is detected. The control section 255 detects the value of the current flowing through each of the electrodes 131, 132, 133 and 134. Based on the value of the current, the electric resistance between the electrodes 131, 132, 133 and 334 is calculated. Based on the calculated electric resistance, the control section 256 calculates the coordinate value of the position at which the transparent electrodes 114 and 124 contact each other. The control section 255 causes the electronic device 2500 to operate with a prescribed function in accordance with the content of the menu icon 161 corresponding to the detected coordinate value.

In this example, the transparent panel 324 acts as a resistance film system touch panel. In other words, the transparent panel 324 acts both as a touch panel and as a transparent panel for acoustic signal reproduction. The acoustic pipe is provided in connection with the space 326, and a sound output from an electric-mechanical-acoustic-transducer is transferred to the space 326. Thus, the sound from the touch panel can be easily output. In a structure of using a resistance film system touch panel, a space is necessarily and easily provided between the touch panel and the display panel or the substrate.

A electronic device, including a panel which is usable both as the touch panel and the transparent panel for acoustic signal reproduction, reproduces a sound from the touch panel. The component for acoustic signal reproduction can be simplified. In such an electronic device, a speaker system according to the present invention can be easily produced. The touch panel is transparent and transmissive with respect to visible light. Therefore, the touch panel does not shield an image displayed in the display panel.

The spacer 625 is provided in order to form the space 326 between the substrate 327 and the transparent panel 324 for transferring a sound. The spacer 625 may be an adhesive or an adhesive film.

In this example, the transparent panel 324 also acts as a resistance film system touch panel. Alternately, the transparent panel 324 may also act as, for example, an electrostatic system, an optical system, an electromagnetic system, or an ultrasonic system touch panel. Regardless of the system, substantially the same effecting provided.

The substrate 327 may be omitted and the transparent electrode 124 may be provided on the display panel 321. By omitting the substrate 327, the structure to the electronic device 2500 is further simplified. The speaker system 1200 in the third example may be used instead of the speaker system 1800.

EXAMPLE 11

In the electronic deviate 2400 in the ninth example and the electronic device 2500 in the tenth example, the transparent panels 234 and 324 are provided such that an image displayed in the display panel 321 is viewed through the transparent panels 234 and 324. A panel for acoustic signal reproduction also acting as a touch panel can operate as a touch panel even though it is not transparent. In this case, the display panel below the panel for acoustic signal reproduction is omitted, but a sound can be output from the panel, for acoustic signal reproduction by forming a space below the panel for acoustic signal reproduction for transferring the sound. In an eleventh example of the present invention, an electronic device 2401 including such a non-transparent panel will be described with reference to FIGS. 23A and 23B.

Figure 23A:
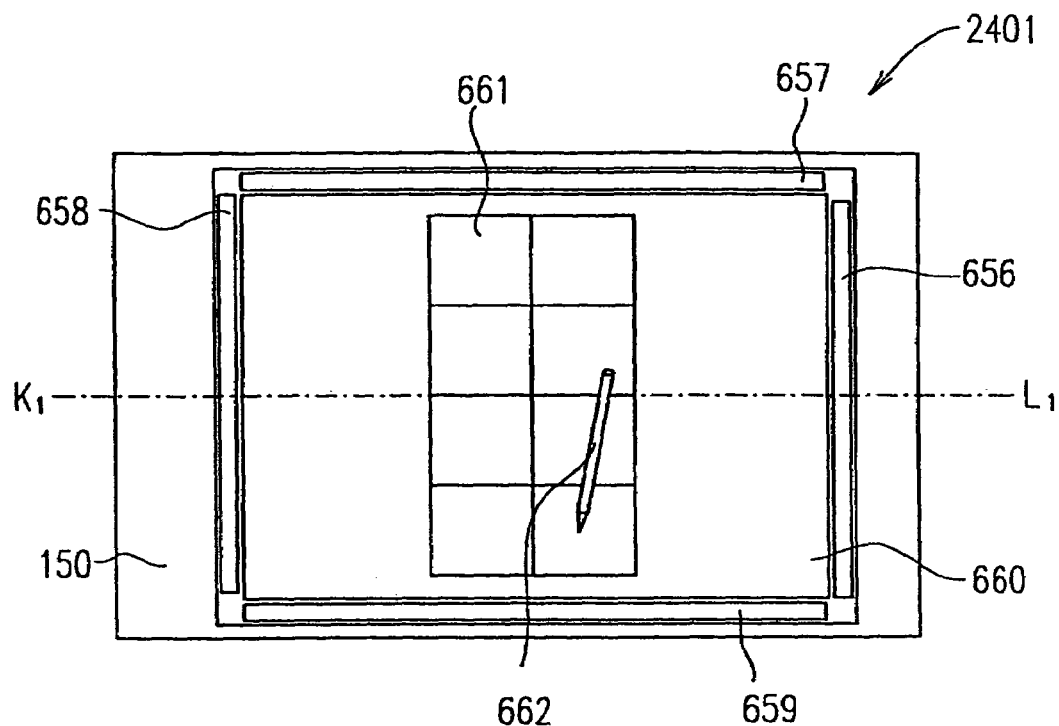
FIG. 23A is a plan view of an electronic device according to an eleventh example of the present invention.
Figure 23B:
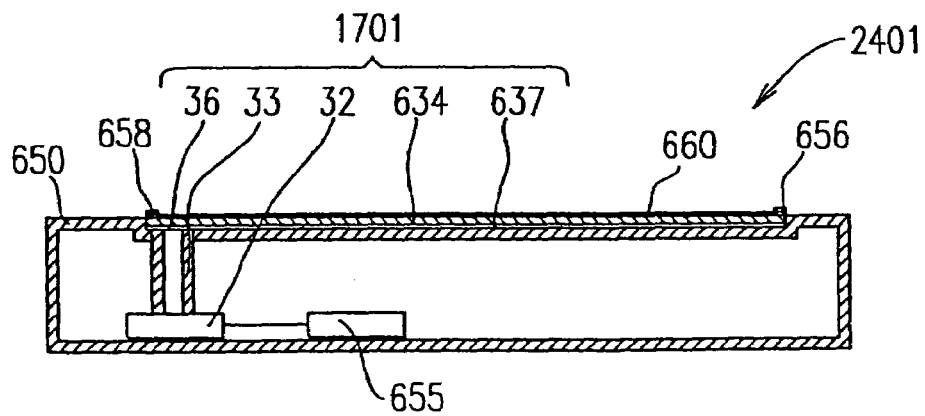
FIG. 23B is a cross-sectional view of the electronic device taken along chain line $K_1$-$L_1$ shown in FIG. 23A.

FIG. 23A is a plan view of the electronic device 2401, and FIG. 23B is a cross-sectional view of the electronic device 2401 taken along chain line $K_1$-$L_2$ shown in FIG. 23A.

The electronic device 2401 include a speaker system 1701 and a housing 650 for supporting the speaker system 1701. The speaker system 1701 includes a panel 634, an electric-mechanical-acoustic-transducer 32, and an acoustic pipe 33. The acoustic pipe 33 acts as an acoustic signal transfer member for transferring a sound output from the electric-mechanical-acoustic-transducer 32 to a space 637 provided between the panel 634 and the housing 650. A peripheral portion of the panel 634 is supported by the housing 650, and the panel 634 is vibrated by the sound transferred from the electric-mechanical-acoustic-transducer 32 to the space 637 via the acoustic pipe 33. The space 637 is preferably a closed space.

The speaker system 1701 is obtained by eliminating the display panel 321 from the structure of the speaker system 1700 (FIG. 21B). The panel 634 is non-transparent. The operation of the panel 634 being vibrated by the sound output generating a sound is similar to the operation of the panel 234 being vibrated by the sound output from the electric-mechanical-acoustic-transducer 32 and generating a sound in the speaker system 1700.

The panel 634 has an operation menu 661 on a surface thereof. The operation menu 661 is, for example, printed on the surface of the panel 634. The surface of the panel 634 with the operation menu 661 is coated with a conductive film 660 such that the resistivity of the surface of the transparent panel 634 is uniform. The panel 634 acts as a conductor. Electrodes 656, 657, 658 and 659 are provided along the four aides of the surface of the transparent panel 634. The electronic device 2401 includes a control section 655 for processing an acoustic signal. The electronic device 2401 further includes a control section 655 for processing an acoustic signal. The control section 655 applies a voltage to each of the electrodes 656, 657, 658 and 659. The panel 634 acts an a touch panel like the transparent panel 234 described in the ninth example.

The user puts an icon click-dedicated input pen 662 or the user's finger an a contact member into contact wit a position of the transparent panel 634 corresponding to an item of the operation menu 661 and applied a pressure to the position. The operation for detecting the position of the transparent panel 634 which is in contact with the icon click-dedicated input pen 662 or the user's finger is substantially the same as the operation described in the ninth example. The control section 655 causes the electronic device 2401 to operate with a prescribed function in accordance with the content of the item of the operation menu 661 at the detected position.

In this example, the panel 634 also acts as a panel for acoustic signal reproduction. An electronic device, including a panel which is usable both as the touch panel and the panel for acoustic signal reproduction, reproduces a sound from the touch panel.

The speaker system 1701 may further include a substrate so as to provide a space between the substrate and the panel 634. An electronic device 2402 including a speaker system 1702 including a substrate 427 will be described with reference to FIGS. 24A and 24B.

Figure 24A:
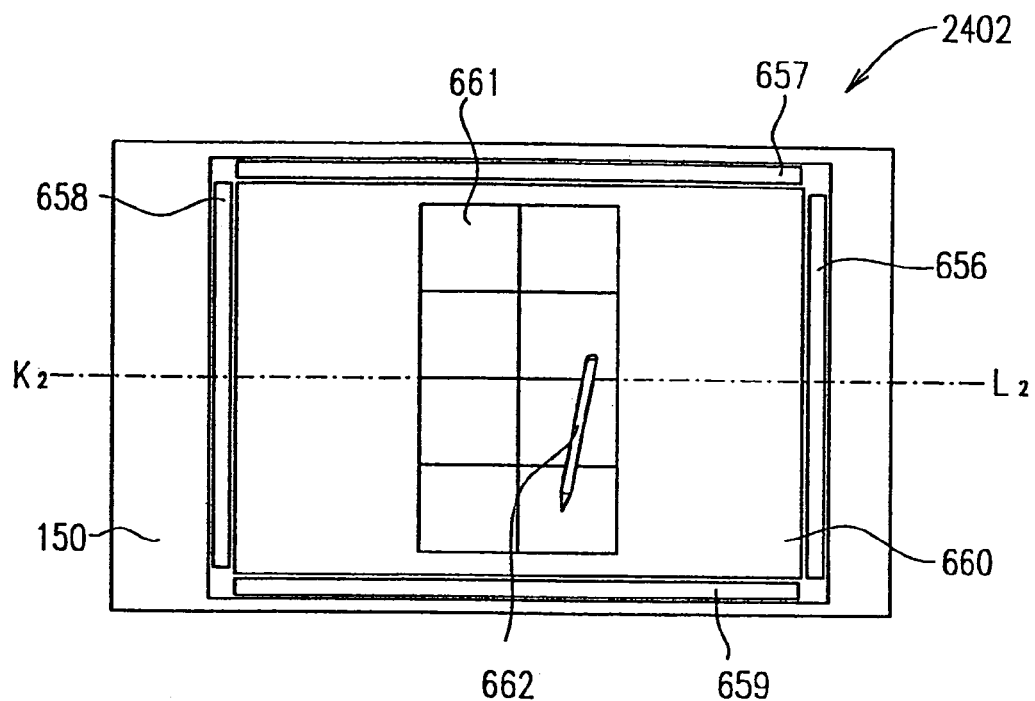
FIG. 24A is a plan view of another electronic device according to the eleventh example of the present invention.
Figure 24B:
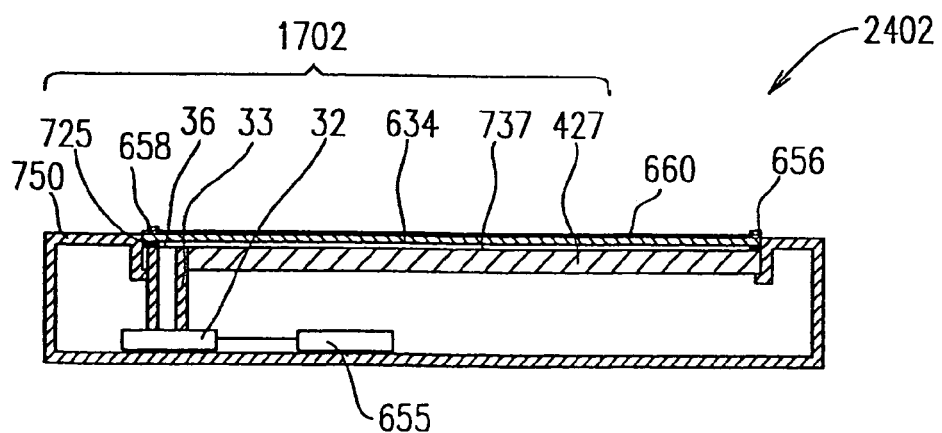
FIG. 24B is a cross-sectional view of the electronic device taken along chain line $K_2$-$L_2$ shown in FIG. 24A.

FIG. 24A is a plan view of the electronic device 2402, and FIG. 24B is a cross-sectional view of the electronic device 2402 taken along chain line $K_2$-$L_2$ shown in FIG. 24A.

The substrate 427 is provided so as to face the panel 631, and a space 737 is provided between the substrate 427 and the transparent panel 634. The electronic device 2402 includes a housing 750 for supporting the substrate 427. The panel 634 and the substrate 427 are connected to each other via a spacer 725. The space 737 is preferably a closed space. The operation of the electronic device 2402 for generating a sound from the panel 634 and the operation of is the panel 634 as a touch panel are substantially the came as those of the electronic device 2401.

In this example, the panel 634 also acts as a electrostatic capacitance system touch panel. Alteratively, electrodes au described in the tenth example may be provided on the panel 634, the housing 650 and the substrate 427, so that the panel 634 also acts as a resistance film system touch panel. The panel 634 may also act as, for example, an optical system, an electromagnetic system, or an ultrasonic system touch panel. Regardless of the system, substantially the same effect is provided.

EXAMPLE 12

Figure 25:
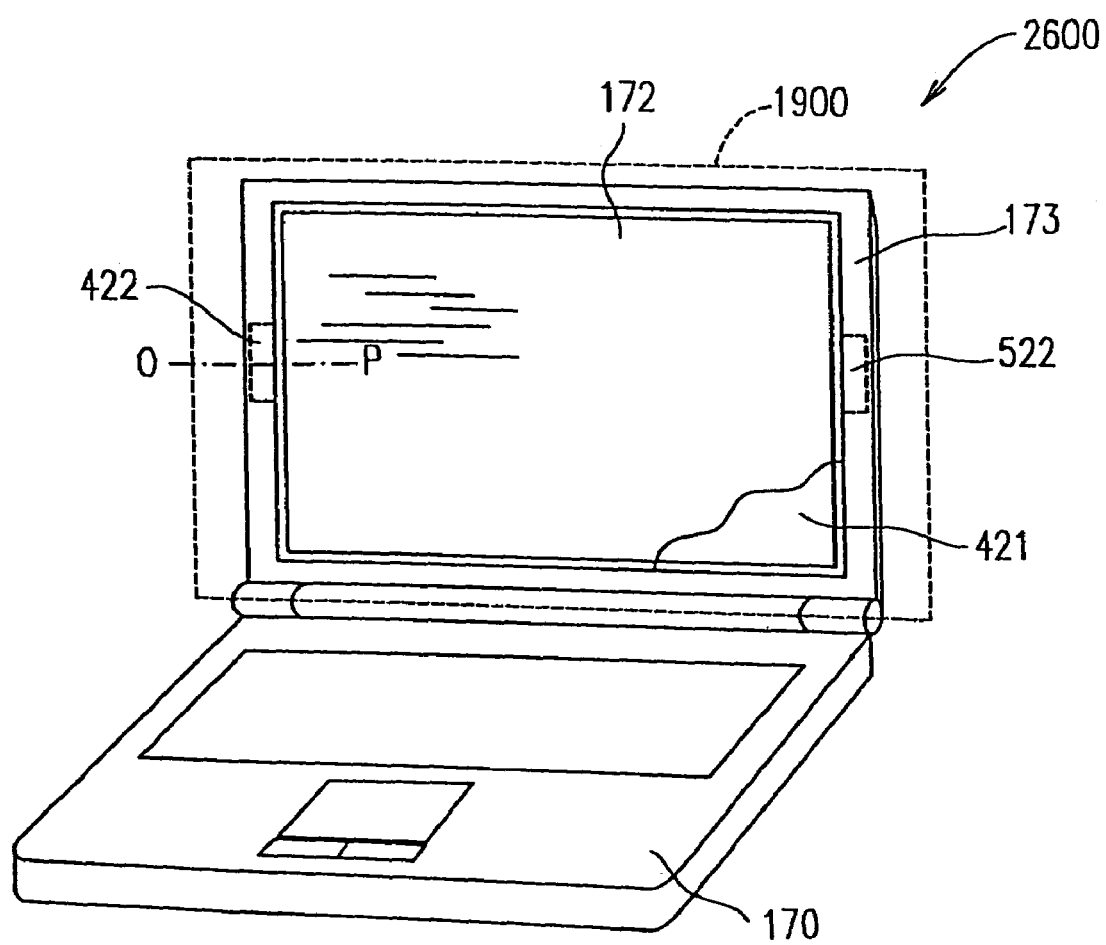
FIG. 25 is an isometric view of an electronic device according to a twelfth example of the present invention.
Figure 26:
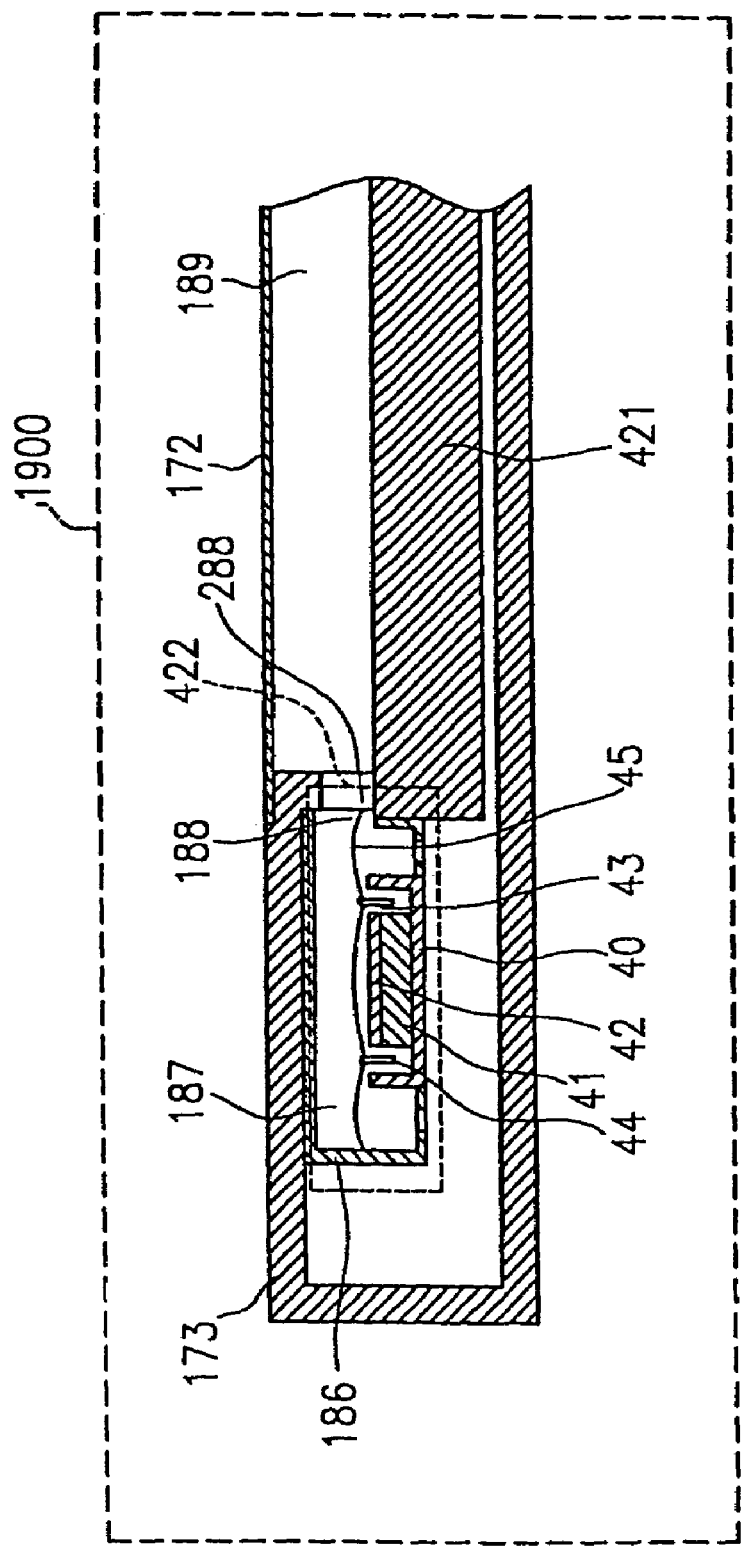
FIG. 26 is a cross-sectional view of a speaker system included in the electronic device taken along chain line O-P shown in FIG. 25.
Figure 27:
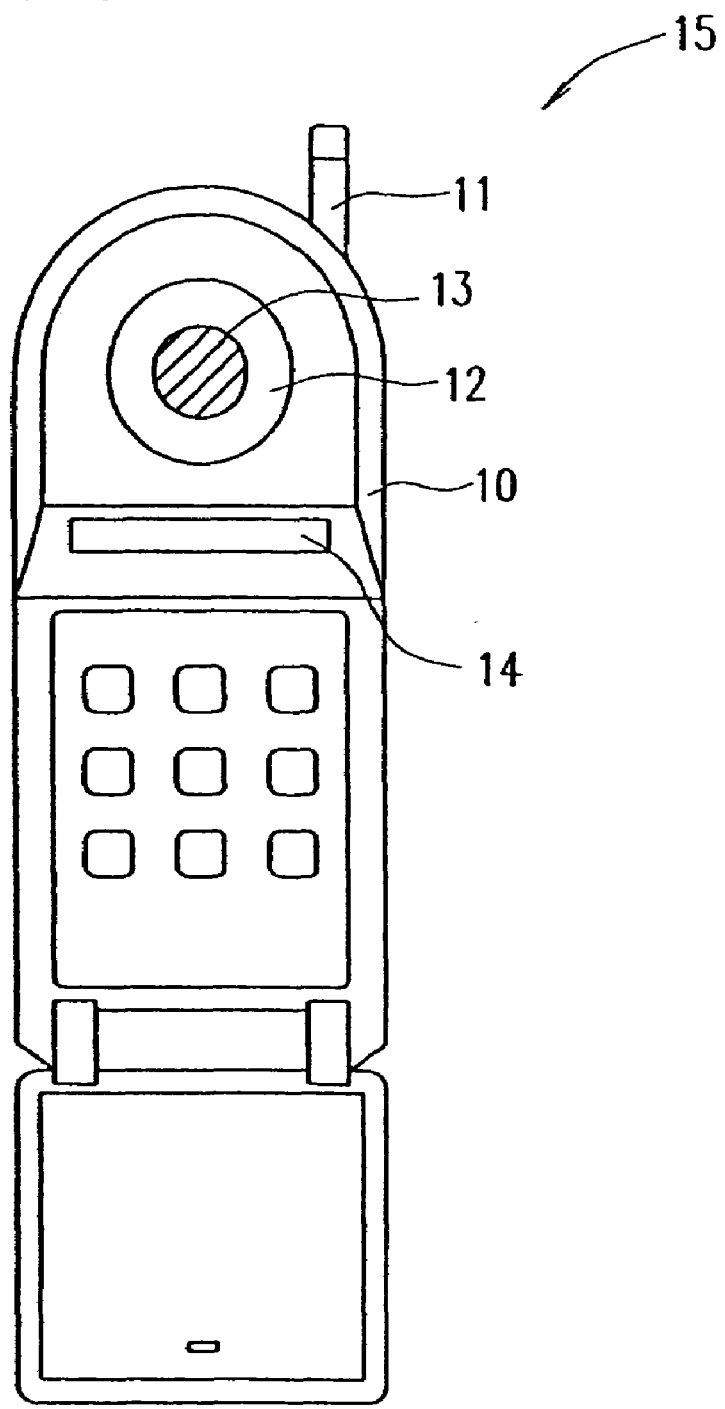
FIG. 27 is a plan view of a conventional speaker system.

An electronic device 2600 according to a twelfth example of the present invention will be described with reference to FIGS. 25 and 26. FIG. 25 is an isometric view of the electronic device 2600, and FIG. 26 is a cross-sectional view of a speaker system included in the electronic device 2600 taken along chain line O-P shown in FIG. 25.

In this example, the electronic device 2600 is described As a notebook computer, which is a mobile terminal device. The electronic device 2600 is not limited to a notebook computer. The electronic device 2600 may be, for example, am installation type electronic device.

The electronic device 2600 includes a housing 170 for accommodating, for example, a CPU and memories (not shown), and a speaker system 1900.

The speaker system 1900 includes a display panel 421, a transparent panel 172 provided such that an image displayed in the display panel 421 is viewed through the display panel 421, an electric-mechanical-acoustic-transducer 422 having a diaphragm 45 (FIG. 26) for vibrating the diaphragm 45 in accordance with an electric signal so as to output a sound, and a housing 173 for supporting the transparent panel 172 and the display panel 421.

The speaker system 1900 has a space 189 between the display panel 421 and the transparent panel 172. The space leg in preferably a closed space. The housing 173 has a sound hole 288. The housing 173 acts as an acoustic signal transfer member for transferring a sound output from the electric-mechanical-acoustic-transducer 422 to the space 189. The transparent panel 172 is vibrated by a sound transferred from the electric-mechanical-acoustic-transducer 422 to the space 189 via the sound hole 288. The transparent panel 172 has an area larger than the area of the diaphragm 45. The display panel 421 may be a liquid crystal display. The transparent panel 172 is formed of PET, glass, an acrylic resin or other materials transmissive with respect to visible light. The electric-mechanical-acoustic-transducer 422 in rectangular.

The electric-mechanical-acoustic-transducer 422 is a modification example of the electric-mechanical-acoustic-transducer 22 shown in FIG. 2. The electric-mechanical-acoustic-transducer 422 includes a housing 186. In this example, the diaphragm 45 is rectangular. In FIG. 26, the shorter side of the diaphragm 45 is shown. The housing 186 covers a top surface and side surfaces of the diaphragm 45 and forms an empty space 187. The housing 186 has a slit opening 188. The opening 188 is communicated with the sound hole 288 of the housing 173.

The speaker system 1900 operates in substantially the same manner as the speaker system 1000 described in the first example including the electric-mechanical-acoustic-transducer 22. Specifically, a sound which is output from the diaphragm 45 of the electric-mechanical-acoustic-transducer 422 is transferred to the space 189 via the empty space 187, the opening 188 and the sound hole 288. The transparent panel 172 is vibrated by the pressure of the sound transferred to the space 189 so as to generate a sound. The speaker system 1900 may further include an electric-mechanical-acoustic-transducer 522. The electric-mechanical-acoustic-transducer 522 includes substantially the same components as those of the electric-mechanical-acoustic-transducer 422. When including the electric-mechanical-acoustic-transducer 522, the speaker system 1900 operates in substantially the same manner as the speaker system 1400 described in the fourth example. The speaker system 1900 can provide a stereo reproduction.

The opening 188 of the housing 186 extends in a direction vertical to a direction in which the diaphragm 45 vibrates. The sound hole 288 of the housing 173, which is in communication with the opening 188, is formed in a direction parallel to a direction in which display panel 421 extends. Owing to such a structure, the electric-mechanical-acoustic-transducer 422 can be provided on the same plane as, and adjacent to, the display panel 421, which and provide the speaker system 1900 with a decreased thickness The sound output from the diaphragm 45 of the electric-mechanical-acoustic-transducer 422 is transferred parallel to the display panel 421. The electric-mechanical-acoustic-transducer 522 can also be provided in the same plans as, and adjacent to, the display panel 421, Therefore, when including the electric-mechanical-acoustic-transducer 522, the speaker system 1900 can be also thin.

The transparent panel 172 is provided such that an image displayed in the display panel 421 is viewed through the display panel 421. Therefore, in the personal computer 2600, the position at which an image is displayed to the user is the same as the position from which a sound is output to the user.

A speaker system according to the present invention is easily applicable to an electronic device including a display panel, for example, a TV, a game machine, or a car navigation system. The transparent panel may act only an a diaphragm for outputting a sound, or may act both As a diaphragm and a touch panel.

In the case where the electric-mechanical-acoustic-transducer has a function of a mechanical vibration function as well as an acoustic signal reproduction function, the two functions can be separately used for specific purpose.

The present invention provides a speaker system displayed in a display panel is viewed through the transparent panel.

The transparent panel can be vibrated. Owing to such a structure, the position at which the image is displayed to the user can be the same as the position from which a sound is output to the user.

According to the present invention, a sound output from a diaphragm having a smaller area la transferred to a space, and a transparent panel having a larger area is vibrated by the sound transferred to the space. Owing to such a structure, even when the transparent panel is relatively heavy, the transparent panel can be vibrated and a sound having a efficient volume can be output by a small force which is sufficient to vibrate a diaphragm.

According to the present invention, a substrate is provided between the display panel and the transparent panel. Since the substrate protects the displays panel against external impacts, the transparent panel can be formed to be thinner, which improves the acoustic characteristics of the transparent panel.

According to the present invention an acoustic pipe is provided as an acoustic signal transfer member for transferring a sound output from an electric-mechanical-acoustic-transducer to the space. Owing to such a structure, the freedom of locating the speaker system in an electronic device or a mobile terminal device including the speaker is increased. Since it is not necessary that the electric-mechanical-acoustic-transducer be provided adjacent to the display panel, the space in which the display panel can be provided can be enlarged, which increases the size of the display panel.

In the case where a speaker system according to the present invention is mounted on a mobile terminal device (for example, a cellular phone), the transparent panel can operate as a diaphragm of a receiver for reproducing a received sound. Since the received sound is reproduced from the entire surface of the transparent panel, the user can hear the received sound wherever the user's ear may be located on the transparent panel having a relatively large area, This eliminates the necessity of putting the position of the user's ear at one particular position of the transparent panel. The user's ear is never deviated from tie sound source. Such a mobile terminal device allows especially an aged user to easily hear the received sound. When the level of the electric signal applied to the speaker system is raised, the speaker system acts as a loudspeaker for outputting a sound having a large volume even when separated from the main body of the mobile terminal device. In this case, the user can use the mobile terminal device as a video phone, by which the user can perform a dialog with a person on the other end while viewing an image on a screen. Since the position at which the image is displayed to the user is the same as the position from which the sound is output to the user, a realistic sound reproduction is provided. Such a mobile terminal device in optimum for simultaneously reproducing a sound and an image.

In the case where the speaker system according to the present invention includes a plurality of electric-mechanical-acoustic-transducer, multiple channel reproduction, far example, a stereo reproduction, is realized.

In the case where the electric-mechanical-acoustic-transducer has a mechanical vibration function as wall as an acoustic signal reproduction function, the speaker system can simultaneously perform the two functions of acoustic signal reproduction and mechanical vibration.

In an electric device including a touch panel, the touch panel can also be used as a transparent panel of the speaker system according to the present invention. In the case, the speaker system according to the present invention can be easily produced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. A mobile terminal device, comprising:
   a speaker system; and
   a housing for supporting the speaker system,
   wherein the speaker system includes a display panel for displaying an image; a transparent panel provided such that the image displayed in the display panel is viewed through the transparent panel; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the display panel and the transparent panel, wherein the transparent panel is allowed to be vibrated by the sound transferred to the space from the electric-mechanical-acoustic-transducer via the acoustic signal transfer member,
   the mobile terminal device further comprising:
   an antenna for receiving a wireless signal; and
   a signal output section for outputting an electric signal to the electric-mechanical-acoustic-transducer based on the wireless signal received by the antenna,
   wherein the electric signal represents at least one of a received sound, a call arrival sound, music and voice.

2. A mobile terminal device according to claim 1, wherein when the electric signal represents the received sound, the transparent panel acts as a receiver.

3. A mobile terminal device according to claim 1, wherein when the electric signal represents one of the call arrival sound, the music and the voice, the transparent panel acts as a loudspeaker.

4. A mobile terminal device according to claim 1, wherein:
   the electric-mechanical-acoustic-transducer includes one more diaphragm,
   the housing has a sound hole,
   one of the diaphragms is provided so as to face the acoustic signal transfer member, and
   the other diaphragm is provided so as to face the sound hole.

5. A mobile terminal device according to claim 1, wherein:
   the speaker system includes:
   at least one more electric-mechanical-acoustic-transducer, and
   at least one more acoustic signal transfer member, and
   the electric-mechanical-acoustic-transducers each include a diaphragm and each output a sound by vibrating the diaphragm in accordance with an electric signal,
   the acoustic signal transfer members each transfer the sound output from the respective electric-mechanical-acoustic-transducer to the space,
   the acoustic signal transfer members are connected to the space at different positions,
   when the electric signal represents at least one of the received sound and the call arrival sound, the electric signal is input to the electric-mechanical-acoustic-transducers, and
   when the electric signal represents the audio information for the plurality of channels, an electric signal representing audio information for each of the plurality of channels is input to the respective electric-mechanical-acoustic-transducer.

6. An electronic device, comprising:
a speaker system; and
a housing for supporting the speaker system,
wherein the speaker system includes a display panel for displaying an image; a transparent panel provided such that the image displayed in the display panel is viewed through the transparent panel; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the display panel and the transparent panel, wherein the transparent panel is allowed to be vibrated by the sound transferred to the space from the electric-mechanical-acoustic-transducer via the acoustic signal transfer member.

7. An electronic device according to claim 6, further comprising a control section for controlling an operation of the electronic device,
wherein:
the transparent panel also acts as a touch panel for detecting a contact of a contact member with a position of the transparent panel corresponding to an operation menu icon displayed in the display panel, and
the control section causes the electronic device to operate in accordance with the operation menu icon corresponding to the position of the transparent panel which is in contact with the contact member.

8. An electronic device according to claim 7, wherein the touch panel is one of an electrostatic system touch panel, an optical system touch panel, an electromagnetic system touch panel, and an ultrasonic system touch panel.

9. A mobile terminal device, comprising:
a speaker system; and
a housing for supporting the speaker system,
wherein the speaker system includes a display panel for displaying an image; a transparent panel provided such that the image displayed in the display panel is viewed through the transparent panel; a substrate provided between the display panel and the transparent panel such that the image is viewed through the substrate; an electric-mechanical-acoustic-transducer having a diaphragm for outputting a sound by vibrating the diaphragm in accordance with an electric signal; and an acoustic signal transfer member for transferring the sound output from the electric-mechanical-acoustic-transducer to a space provided between the transparent panel and the substrate, wherein the transparent panel is allowed to be vibrated by the sound transferred to the space from the electric-mechanical-acoustic-transducer via the acoustic signal transfer member,
the mobile terminal device further comprising:
an antenna for receiving a wireless signal; and
a signal output section for outputting an electric signal to the electric-mechanical-acoustic-transducer based on the wireless signal received by the antenna,
wherein the electric signal represents at lease one of a received sound, a call arrival sound, music and voice.

10. A mobile terminal device according to claim 9, wherein when the electric signal represents the received sound, the transparent panel acts as a receiver.

11. A mobile terminal device according to claim 9, wherein when the electric signal represents one of the call arrival sound, the music and the voice, the transparent panel acts as a loudspeaker.

12. A mobile terminal device according to claim 9, wherein:
the electric-mechanical-acoustic-transducer has one more diaphragm,
the housing has a sound hole,
one of the diaphragms is provided so as to face the acoustic signal transfer member, and
the other diaphragm is provided so as to face the sound hole.

* * * * *